United States Patent [19]
Hubbell et al.

[11] Patent Number: 5,966,121
[45] Date of Patent: *Oct. 12, 1999

[54] INTERACTIVE HYPERVIDEO EDITING SYSTEM AND INTERFACE

[75] Inventors: John R. Hubbell; Daniel J. Halabe, both of Evanston; Stephanie A. Douglas, Chicago, all of Ill.

[73] Assignee: Andersen Consulting LLP, Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/542,297

[22] Filed: Oct. 12, 1995

[51] Int. Cl.$^6$ ........................................................ G06F 3/14
[52] U.S. Cl. .............................................................. 345/328
[58] Field of Search ...................................... 395/327, 328, 395/806, 807, 972, 978, 335, 339, 347, 348, 773, 761, 792, 762; 345/327, 328, 302, 972, 978, 335, 339, 347, 348, 473; 707/512, 500, 530, 501

[56] References Cited

U.S. PATENT DOCUMENTS

| | | | |
|---|---|---|---|
| 4,333,152 | 6/1982 | Best | 395/327 |
| 4,422,105 | 12/1983 | Rodesch et al. | 395/762 X |
| 5,109,482 | 4/1992 | Bohrman | 395/328 |
| 5,353,391 | 10/1994 | Cohen et al. | 345/435 |
| 5,363,482 | 11/1994 | Victor et al. | 395/762 X |
| 5,367,621 | 11/1994 | Cohen et al. | 395/762 |
| 5,524,193 | 6/1996 | Covington et al. | 395/773 |
| 5,539,871 | 7/1996 | Gibson | 395/762 |

Primary Examiner—Matthew M. Kim
Assistant Examiner—Crescelle N. dela Torre
Attorney, Agent, or Firm—Merchant, Gould, Smith, Edell, Welter & Schmidt, P.A.

[57] ABSTRACT

An apparatus and method for interfacing with a hypervideo multimedia application when composing and playing same is disclosed. A novel hypervideo control and interface provides for either user-actuated or automatic transitioning between a plurality of video, graphics, textual, animation, and other types of multimedia files. A hypervideo control preferably transitions through distinct lifecycle phases and events as it is presented and removed from an interface display to visually convey to a user the present availability and impending removal of the control from the interface display, thereby providing an intuitive means for navigating a hypervideo application. In one embodiment, a hypervideo editing system includes a wordprocessing system and a separate video playback system. An author of a hypervideo application preferably identifies a particular frame of video displayed by the video playback system and creates an ASCII compliant mark video file that defines the type and functional characteristics of hypervideo controls, marks, and actions using the wordprocessing system. In a preferred embodiment, editing and playing of a hypervideo application is facilitated by a software-implemented hypervideo editing system that provides an intuitive graphical-user-interface (GUI) to facilitate rapid, real-time hypervideo application development, as well as playback capability. Object-oriented design principals are preferably employed to permit efficient linking and embedding of a hypervideo application or interface into an off-the-shelf software application or other parent application.

34 Claims, 18 Drawing Sheets

| CONTROL ATTRIBUTE | CONTAINS CUT POINT? | ACTION OCCURS |
|---|---|---|
| Immediate | NO | Immediately |
| Immediate | YES | Immediately |
| Cut Point | NO | Ignore |
| Cut Point | YES | Next Cut Point |

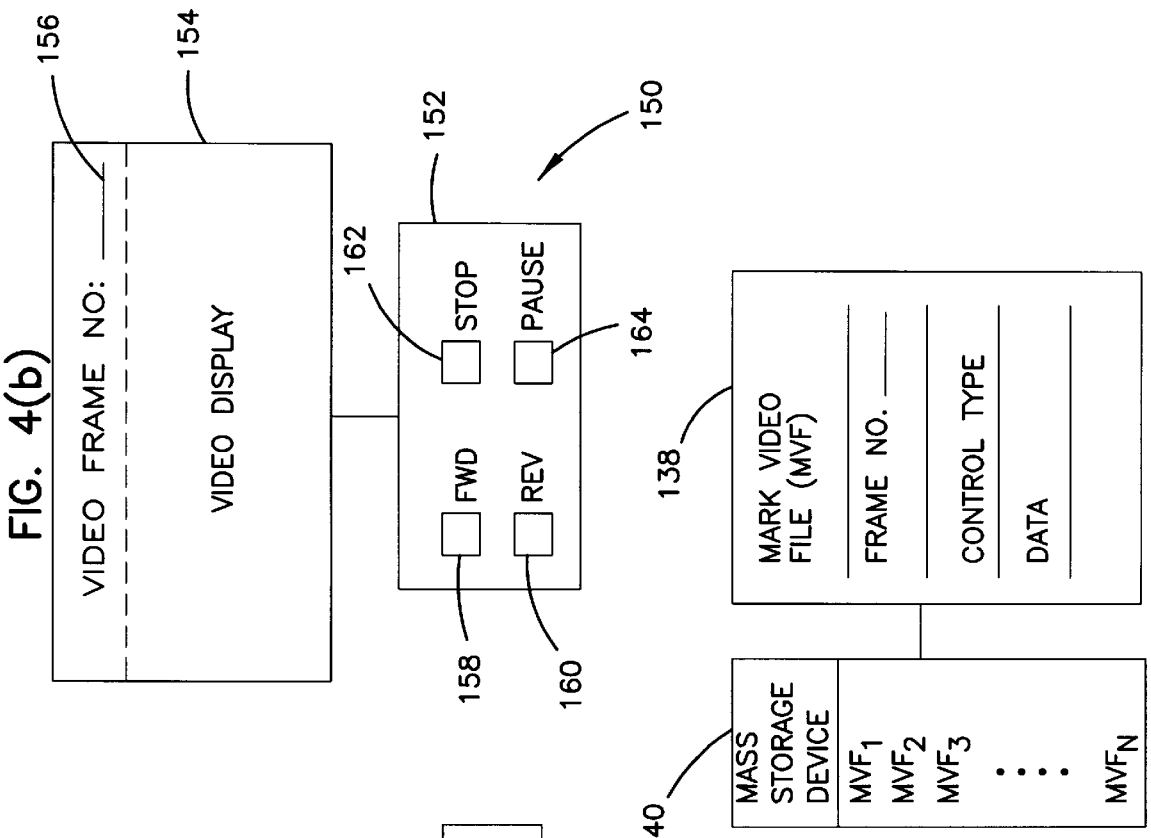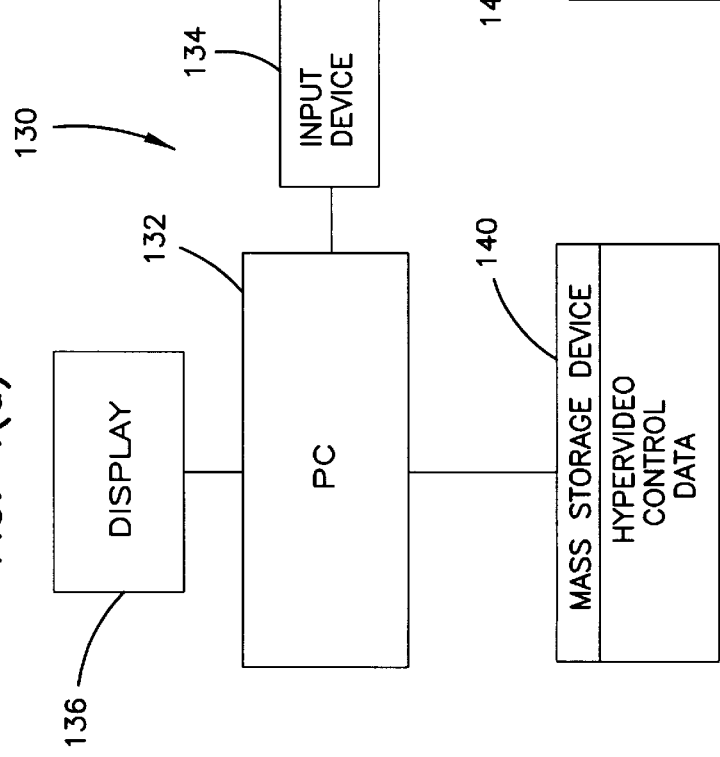

INTERACTIVE HYPERVIDEO EDITING SYSTEM AND INTERFACE

FIELD OF THE INVENTION

The present invention relates generally to digital video, and, more particularly, to an interactive hypervideo editing system and interface for composing, playing, and interacting with a hypervideo application.

BACKGROUND OF THE INVENTION

Advancements in digital video technology have resulted in the proliferation of computer-based video products in commercial and consumer markets. The continuing development of new generations of high-speed microprocessors has enabled software developers to develop motion video applications for use on the personal computer. One such emerging category of motion video applications includes software-implemented video editing systems.

Prior to exploiting the processing capability of desktop computers to facilitate the video editing process, a traditional editing approach typically involved physically splicing taped segments of video under a microscope using very expensive equipment. More recently, computer-based video editing systems were developed that increased the efficiency of the editing process, but provided limited functionality due to the inherent linear nature of such early computer-based editing systems. In general, such linear editing solutions required a user to constantly seek from one portion of a video tape to another portion in order to view various non-sequential segments of a video program. It can be appreciated that a linear editing approach is very time-consuming and severely limits the degree to which various special effects, such as dissolves and wipes, can be effectuated.

Presently, a number of hardware and software manufacturers have developed non-linear type video editing tools that provide a variety of special effects. With the advent of more powerful microprocessors and high-bandwidth bus architectures, desktop video editing has been made available to the consumer market. Such personal computer-based editing systems, however, generally provide only a limited degree of functionality and capability in comparison to their expensive, high-end mainframe counterparts.

Various software applications have been developed to play motion video files on personal computer systems. Two very popular desktop video playback applications are QuickTime™, which operates on Macintosh® compatible personal computers, and Video for Windows®, which operates on AT-type compatible personal computers. Although these and other similar products provide a means for playing back motion video files on a personal computer, consumers and other video program developers continue to seek video editing tools to enable them to produce multimedia video applications efficiently and at a relatively low cost. A number of video editing software tools have been developed for consumer-grade personal computers. These systems generally employ digital video compression techniques to digitize and compress analog video in order to significantly reduce the amount of hard disk memory allocated for storing video files, and to permit random access to desired locations in a video program.

A conventional desktop video editing system typically provides a multimedia developer with a number of editing capabilities, including various special effects, transitions, and the capability to effectively splice together various independent video and audio clips. Such systems permit the development of multimedia applications that are often designed to follow a pre-established script or storyboard. A multimedia developer may also produce an interactive multimedia application in which a user can, to some degree, control the progression of application playback.

A traditional approach to providing a user-interactive interface for navigating a multimedia application storyboard involves prompting a user as to the existence of a deviation point in the presentation, and presenting available navigation options upon reaching the deviation point, typically by presenting to the user a list of question on the video display. Depending on the user's response to the questions presented on the display, the desired deviation from the current presentation or, if selected, continuation of the current presentation is effectuated.

It can be appreciated that this and similar methods for prompting a user as to the existence of a deviation point or other user-actuatable function through the interactive interface interrupts the continuity of the presentation, requires the user to read the displayed prompt message and respond accordingly, and generally disrupts the overall flow and effectiveness of the multimedia presentation.

Another significant deficiency associated with conventional desktop video editing systems concerns the inherent difficulty of modifying data associated with the video and audio signal components of a multimedia application. More specifically, a multimedia information signal or bitstream is typically comprised of a video signal portion, and audio signal portion, and a data signal portion which are multiplexed or interleaved into a composite multimedia bitstream. The video signal portion represents the visual content of the multimedia bitstream, while the audio signal portion represents the audio content of the multimedia bitstream. The data signal portion generally represents instructions and other information which, when interpreted by a computer, effect various multimedia functions, such as visual prompts to a user and effecting diversions from a current presentation.

Generally, the video, audio, and data signal portions are interleaved or multiplexed into an integral multimedia bitstream, and generally organized in accordance with a proprietary format. The incorporation of the data signal portion into a composite multimedia bitstream significantly increases the difficulty of efficiently modifying a multimedia application. The instructions associated with diversions, prompts, and other interactive functions in a multimedia application, which are typically defined in the data signal portion of the multiplexed multimedia bitstream, are generally indistinguishable and inaccessible from other signal portions, thereby virtually precluding the opportunity of efficiently modifying the data signal portion. Any such modifications may, if at all, be accomplished by recreating the effected portion of a multimedia application.

There exist a keenly felt need in the digital video industry for an intuitive technique for prompting a user as to the existence of an interactive function during a multimedia presentation without distracting the user or interrupting the continuity of the multimedia presentation. There exists a further need for a video editing format that permits access to, and efficient modification of, the data signal portion of a multimedia bitstream. The present invention fulfills these and other needs.

SUMMARY OF THE INVENTION

The present invention is an apparatus and method for composing and interacting with a hypervideo application. A novel hypervideo control and interface provides for user-actuated and automatic transitioning between a plurality of video, graphics, textual, animation, and other types of multimedia files when navigating through a hypervideo application. A hypervideo control preferably transitions through distinct lifecycle phases and events as it is presented on and removed from an interface display to visually convey to a user the present availability and impending removal of the control from the interface display.

In one embodiment, a hypervideo editing system includes a wordprocessing system and a separate video playback system. In accordance with this embodiment, an author of a hypervideo application preferably identifies particular frames of the video displayed by the video playback system and creates a mark video file that defines the type and functional characteristics of various hypervideo controls, marks, and actions using the wordprocessing system. The mark video file preferably conforms to an ASCII format to permit easy creation and modification.

In a preferred embodiment, editing and playing of a hypervideo application is facilitated by a software-implemented hypervideo editing system that provides an intuitive graphical-user-interface (GUI) to facilitate rapid, real-time hypervideo application development, as well as application playback capability. In accordance with this embodiment, the process of creating and modifying hypervideo marks, controls, and actions associated with one or more audio/video segments is preferably accomplished using the GUI interface which, in one embodiment, results in the creation or editing of an ASCII mark video file containing the hypervideo marks, controls, and actions. Object-oriented design principals are preferably employed in the implementation of the software-based hypervideo editing system to permit efficient linking and embedding of a hypervideo application or interface into off-the-shelf software applications and other parent applications.

BRIEF DESCRIPTION OF THE DRAWINGS

FIGS. 4(a)–4(c) are block diagrams illustrating a hypervideo editing system that includes a separate video playback system and a separate wordprocessing system, which are cooperatively operated to create and edit mark video files that define the functionality of a hypervideo application;

DETAILED DESCRIPTION OF THE PREFERRED EMBODIMENTS

Figure 1:
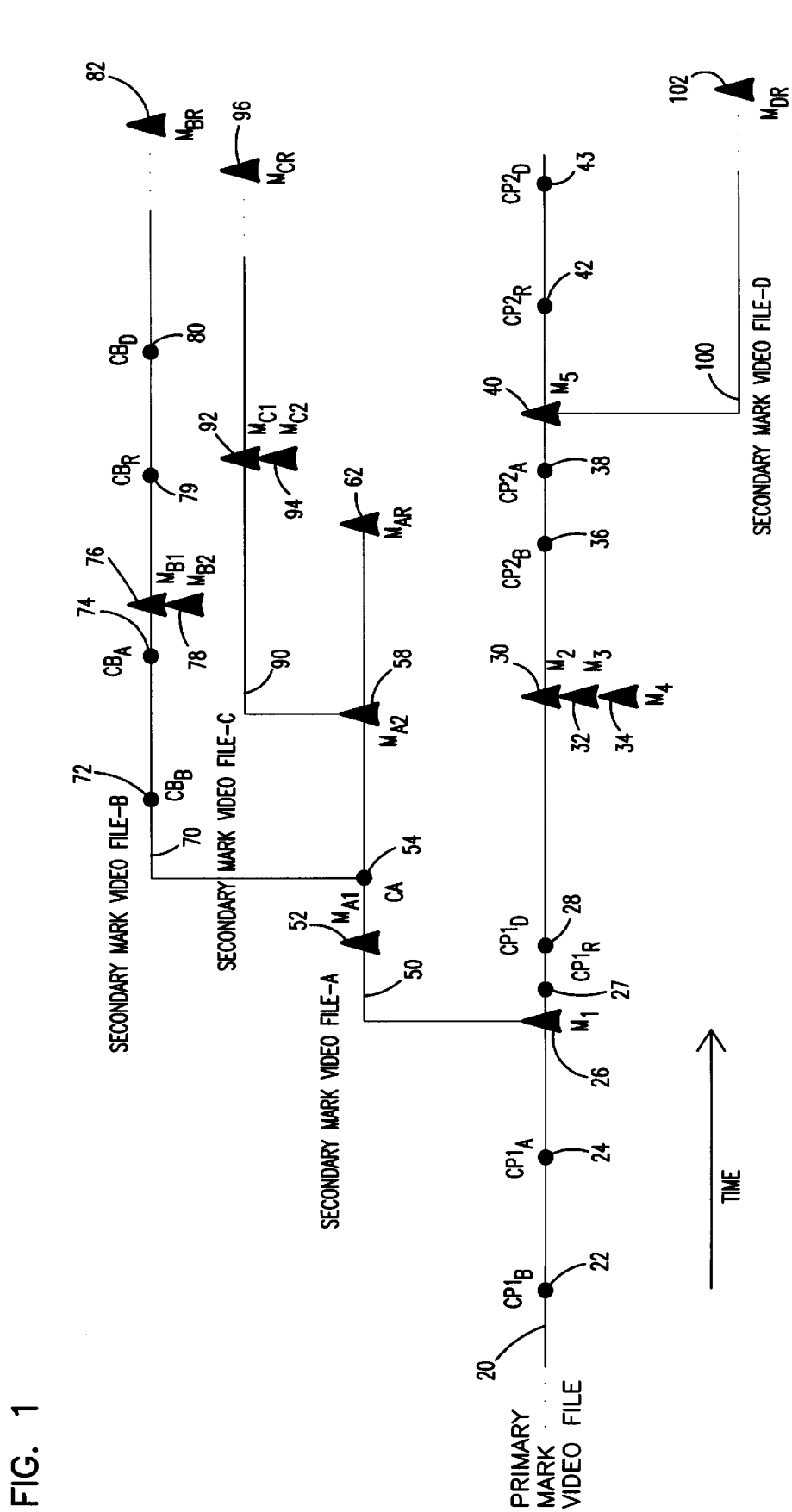
FIG. 1 is a graphical representation of various hypervideo controls, actions, and marks contained in a primary mark video file and related secondary mark video files that together define a portion of a hypervideo application which can be interactively or passively navigated by a user.

The present invention is an apparatus and method for composing, playing, and interacting with a multimedia application. In one embodiment, a hypervideo multimedia application is employed as the primary user-interface for an off-the-shelf software application, such as a spreadsheet or wordprocessor, or, alternatively, as an interactive or passive stand-alone application. Composing a hypervideo application is preferably accomplished by associating selected frames of a digital video program segment with particular hypervideo actions, with each of the actions being defined in a data file, referred to herein as a mark video file, which preferably conforms to an ASCII format. Enhanced user interaction with a hypervideo application is provided by novel hypervideo controls that may be defined to exhibit time-dependent transition characteristics that visually convey the current availability and impending unavailability of the user-actuatable controls during predefined portions of a multimedia presentation. The hypervideo controls, actions, and functions as described hereinbelow provide the multimedia author a means for rapidly and intuitively composing a digital video interface that seamlessly incorporates a multiplicity of video, audio, text, graphics, and animation files, among others, in an orchestrated, navigatable manner.

DEFINITIONS

"Hypervideo" is a term used herein to broadly describe a technology that encompasses motion video, video and audio clips, animation, graphics, text, and other informational sources for presentation to a user generally in an integrated, orchestrated manner. A "hypervideo application" is a term that broadly describes a computer-implemented application for developing, editing, and executing a multimedia presentation.

A "hypervideo editor" is an computer-implemented application intended to facilitate rapid, interactive development of hypervideo style applications and interfaces. The hypervideo editor includes an interface that is preferably graphical based, thus allowing a user to manipulate the characteristics of a hypervideo application both with a mouse and through application menus. The hypervideo editor provides an intuitive interface with which hypervideo applications can be interactively created and edited, thus supporting both editing and playback functionality.

A "video window" is a portion of an interface display within which a video segment or other media file is presented to a user. The video window can be of varying size and located at arbitrary positions in the interface display. Generally, the video window appears on top of any controls, with the exception of hotspots, and supports transition effects to enhance the transition or branching between hypervideo documents and media files.

A "ruler" is a region of a display interface which indicates the state of a hypervideo document over all or a portion of a hypervideo application. Generally, a ruler area is displayed across the bottom of a document window which contains the ruler and ruler related controls. The state of the ruler is updated as the state of the document changes. Scroll bars permit a user to scroll to other regions of the document which are reflected in movement of a ruler indicator in the ruler area.

A "place" defines a particular point or location in a video segment. The terms "place" and "frame" within the context of a video segment are generally used interchangeably herein.

An "action" describes a particular hypervideo function to be performed. An action may or may not effect the current application, video file or media file. Actions are associated with, or more specifically, executed by hypervideo controls and hypervideo marks (defined hereinbelow). Generally, for each action, a notification is sent to the parent application, when applicable, to give the parent application knowledge of what action has occurred.

A "mark" is a generic term within the context of a hypervideo application or document that defines an association between a "place" or frame of a video segment and a particular hypervideo action. In general, a hypervideo application is developed to include a number of marks, some of which are defined as hypervideo controls, actions, and functions, for example.

A "mark video file" is a data file containing information that defines the type and functionality of hypervideo controls, marks, actions, or functions. A mark video file typically contains a number of "mark files" that define a corresponding number of individual hypervideo control, marks, actions, or functions. In a preferred embodiment, a mark file, and likewise a mark video file, has a predefined file structure for storing hypervideo data elements in an ASCII format.

A "control" is an hypervideo element that can issue one or more actions based on input from a user. The user typically interacts with a hypervideo application by clicking on a control presented on the display interface. Controls can either be visible or invisible. A visible control can appear in the interface in a variety of ways, including as a button, a graphic image, or as a textual label, for example. An invisible control, often referred to as a hotspot, is generally presented as a transparent rectangle or other geometric figure that is actuatable by a user. Hotspots can be placed anywhere in the interface, such as over a video window or other graphic image. Generally, clicking on a control causes a change in the presentation of the current video file being displayed in the video window on the display interface. A user can "navigate" a hypervideo application by actuating desired controls, including controls that permit transitioning between a currently presented video file and other video or media files.

A "lifecycle phase" of a hypervideo control is associated with visually perceivable characteristics of the control that change or evolve during the presentation of a video or media file. In one embodiment, a hypervideo control can exhibit distinct, visually perceivable characteristics during three distinct lifecycle phases, including a childhood, adulthood, and a retirement phase. Each of these lifecycle phases is delineated by four "lifecycle events," including a birth, adult, retire, and death event. A primary purpose of modifying the appearance of a hypervideo control over time is to prompt a user to a change in the interface and to convey to the user the impending removal or death of the control from the interface.

"Transition effects," such as fading, dissolving and morphing, for example, are generally employed during the childhood and retirement lifecycle phases of a hypervideo control. It is noted that the term morphing is understood in the art as the combining of two or more images together to produce a composite image where elements of a start image are faded and distorted into those of an end image. A transition effect during the retirement phase of a visible hypervideo control, for example, is typically very important since a user needs to be made aware of a control's impending death so that the control can be selected, if desired, before it is no longer made available in the interface.

A "cutpoint" is a predetermined place or frame of a video segment from which control actions are executed. If a cutpoint exists, a control's action is delayed until the cutpoint frame is reached. Upon reaching the cutpoint, the action is executed. In general, a cutpoint is used to demarcate the end point of a complete thought or theme associated with a portion of a video segment. A cutpoint permits the complete presentation of a thought or theme in a video segment portion prior to execution of an associated action, such as a branch or other action.

HYPERVIDEO APPLICATION STRUCTURE

Referring now to the Figures, and more particularly, to FIG. 1, there is depicted in storyboard form a portion of a hypervideo application or document illustrating various hypervideo controls, marks, and actions associated with a primary video file and four secondary media files. The storyboard layout illustrated in FIG. 1 represents the flow of a multimedia presentation, deviation points in the presentation, associations between the primary and secondary media files, and between any number of secondary media files. All user-initiated and automatic activities occurring in the interface and among the video and media files during hypervideo composition and playback are defined by the various hypervideo controls, marks, and actions shown in FIG. 1.

In practice, a primary mark video file 20 is typically established as the primary source of hypervideo data associated with a primary video file which forms the backbone of a multimedia presentation. One or more secondary mark video files contain hypervideo data associated with a corresponding number of secondary media files. The data contained in a primary or secondary mark video file defines the type and functionality of hypervideo elements, such as controls, marks, or actions, as well as link data that defines destination and return location information for effecting branch transitions between video and media files. In a preferred embodiment, and as developed in greater detail hereinbelow, the data defining the primary mark video file and the data defining any associated secondary mark video files are preferably maintained completely separate from the audio/video signal or bitstream information that constitutes the primary and/or secondary video and media files.

Figures 2, 3:
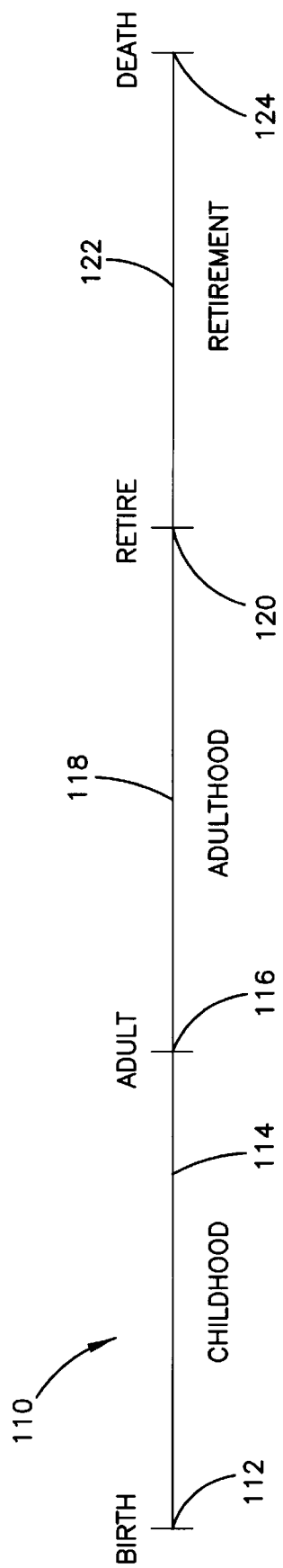
FIG. 2 is a graphical representation of three distinct lifecycle phases defined by four distinct lifecycle events that define the visual evolution of a novel hypervideo control when presented on and removed from a display interface.
FIG. 3 is a chart describing various attributes and hypervideo actions that can be defined for a novel hypervideo control.

Referring now to FIGS. 1 and 2, an important feature of the interactive hypervideo interface described herein concerns the lifecycle characteristics of a novel hypervideo control. As described previously, a hypervideo control 110 preferably exhibits distinct, visually perceivable characteristics during three distinct lifecycle phases, including a childhood phase 114, an adulthood phase 118, and a retirement phase 122. The lifecycle phases are delineated by four lifecycle events, including a birth event 112, an adult event 116, a retire event 120, and a death event 124. The childhood phase 114 is initiated by the birth event 112 and terminated with the adult event 116. The adulthood phase 118 is initiated by the adult event 116 and terminated with the retire event 120. The adulthood phase 118 of a hypervideo control typically represents the longest phase of a control's lifecycle during which the control preferably maintains a steady state form. Finally, the retirement phase 122 is initiated by the retire event 120 and terminated with the death event 124.

At the birth event 112, a hypervideo control 110 is initially introduced in the interface display. A transition effect, such as a fade or dissolve, may be employed to initially display the control 110 in a non-distracting or non-disruptive manner. Alternatively, the control 110 may be initially displayed in a mature form, with little or no modification made to its visible characteristics during it childhood phase 114. Preferably, the visually perceivable characteristics of the control 110 evolve throughout the childhood phase 114, with the control being minimally observable immediately after its birth event 112 and gradually increasing in visibility to a conspicuous state at the adult event 116.

The control 110 is preferably displayed in a conspicuous or mature state during its adulthood phase 118. The control preferably maintains its steady-state adulthood form until the retirement phase 122 is initiated upon the termination of the adulthood phase 118 by the retire event 120. Preferably, the visually perceivable characteristics of the control 110 devolve throughout the retirement phase 122, with the control being observable in its steady-state form upon initiation of the retire event 120 and gradually decreasing in visibility to a nearly inconspicuous state immediately prior to its death event 124, at which point the control 110 is removed from the interface and is no longer actuatable by the user. As mentioned previously, a primary purpose of modifying the appearance of a hypervideo control over time is to visually prompt a user to a change in the interface and to convey to the user the impending death or removal of the control from the interface.

For purposes of illustration, it is assumed that the hypervideo application illustrated in FIG. 1 permits a user to navigate through documentaries of famous people. In accordance with this illustrative example, it is assumed that a documentary on President Richard Nixon is being presented to the user. During the presentation, a narrator mentions President Nixon's Vice President, Gerald Ford. At this point in the presentation, a button control CP1 is introduced in the interface with the caption "More on Nixon/Ford Relationship." Depending on the functionality of the button control CP1, a user clicking on the control CP1 may cause a secondary video segment to execute that discusses the relationship between the two men or, alternatively, a graphics file showing the two men may be displayed along with the broadcasting of supporting narration.

In this illustrative example, the state of the button control along the timeline at the location indicated as $CP1_B$ 22 represents the birth event that initiates the childhood phase of the button control CP1. As the primary video file presentation progresses, the button control CP1 evolves or transitions from its childhood phase to its adulthood phase at an adult event indicated as $CP1_A$ 24. At a later point along the primary mark video file 20 timeline, a hypervideo mark $M_1$ 26 is defined between the adult event $CP1_A$ 24 and a retire event $CP1_R$ 27 of the button control CP1. The retire event $CP1_R$ 27, which defines the initiation point of the button control's retirement phase, is followed by a death event at a subsequent location indicated as $CP1_D$ 28. In this example, the button control CP1 is defined to execute a branch transition action to effectuate a transition in the multimedia presentation from the primary video file on Nixon to a secondary media file on the Nixon/Ford relationship.

More particularly, user-actuation of the button control CP1 executes a branch transition action to effectuate the presentation of a secondary media file-A on the Nixon/Ford relationship having associated with it a secondary mark video file-A 50. The mark file for the button control CP1 includes branching data that identifies the secondary mark video file-A 50 and, upon actuation of button control CP1, initiates the presentation of the secondary media file-A in the interface. In some applications, the branch transition from the primary mark video file 20 to the secondary mark video file-A 50 may result in suspending the presentation of the primary video file concurrently with the initiation of the secondary media file-A presentation. In other applications, the presentation of the primary video file may continue concurrently with the presentation of the secondary media file-A.

An important feature of the novel hypervideo control concerns the cooperative operation between the button control CP1, preferably having the previously described lifecycle phase attributes, and the mark $M_1$ 26 which, in this example, is defined to be a cutpoint in the presentation of the primary video file. As discussed previously, the cutpoint defined by the mark $M_1$ 26 represents an end point or conclusion to a theme or thought being conveyed during presentation of the primary video file. A user clicking on the button control CP1 during its childhood phase or the portion of its adulthood phase defined prior to the mark $M_1$ 26 delays the desired transition action until the mark $M_1$ 26 is reached.

It is noted that immediate transitioning from the primary video file presentation to the secondary media file-A presentation may be accomplished by user-actuation of the button control CPl at any time during its adulthood phase defined after the mark $M_1$ 26 and during its retirement phase. In the case where the mark $M_1$ 26 is not defined as a cutpoint, a user may actuate the button control CP1 at any point between its birth event $CP1_B$ 22 and its death event at $CP1_D$ 28. In this case, clicking on the button control CP1 results in an immediate branch transition from the primary video file presentation to the secondary media file-A presentation. The chart shown in FIG. 3 tabulates the actuation characteristics of one embodiment of a novel hypervideo control.

Returning to the illustrative example, it is assumed that the cutpoint $M_1$ 26 defines a point in the primary video file presentation on Nixon at which Ford is no longer a principal subject of the narration, yet the image of Ford remains in view. Accordingly, the branch transition associated with the mark $M_1$ 26 from the primary mark video file 20 on Nixon to the secondary mark video file-A 50 on the Nixon/Ford relationship is delayed until the mark $M_1$ 26 is reached. The mark $M_1$ 26 thus represents a conclusion to the Nixon/Ford relationship theme and defines a natural branching point from which to change the flow of the multimedia presentation. The retirement phase of the button control CP1 is initiated at a point $CP1_R$ 27 subsequent to the cutpoint $M_1$ 26 in which Ford remains in view. The button control CP1 further transitions to an imperceivable state (i.e., removed from the interface display) its death event indicated at $CP1_D$ 28 in which Ford is no longer in view. The button control CP1 is thus removed from the interface at its death event $CP1_D$ 28, thus rendering the button control CP1 non-actuatable by the user.

As further illustrated in FIG. 1, the secondary mark video file-A 50 may include various hypervideo marks, controls, and actions which, for example, define branch transitions to other secondary media files, such as secondary media file-B and secondary media file-C. Within the context of the illustrative example, a user clicking on the button control CP1 during presentation of the applicable portion of the primary video file on President Nixon initiates the presentation of a secondary media file-A that discusses the Nixon/Ford relationship. During the presentation of the secondary media file-A, a mark $M_{A1}$ 52 is encountered which, for example, may define a "show" hypervideo action in which a specified hypervideo control, such as a RETURN control, becomes visible in the interface.

During the presentation of the secondary media file-A, it is assumed for purposes of this example that Gerald Ford's wife, Betty, is introduced either visually or through accompanying narration. At this point, a button control CA 54 is displayed in the interface and labeled "Gerald and Betty Ford." In this case, the button control CA 54 is immediately displayed without any transitional effects. This is preferably accomplished by defining the childhood attributes of the button control CA 54 to be equivalent to its adulthood attributes. A user may actuate the button control CA 54 to initiate a branch transition from the secondary mark video media file-A 50 to a secondary mark video file-B 70 which effects the presentation of the secondary video file-B that further discusses the marriage of Gerald and Betty Ford. It is noted that any of the secondary media files may comprise a video file, a text file, a graphics file, an animation file, or other type of multimedia file. The secondary mark video file-B 70, upon actuation, initiates a video segment on the marriage of Gerald and Betty Ford and terminates either through user-initiated branching, such as by actuation of a RETURN button control, or by default upon reaching the end of video (EOV) mark indicated as $M_{BR}$ 82. It is noted that each branch level generally includes a RETURN button control to permit user-initiated branching back to the initial branch transition point of a previously presented video or media file.

As further shown in FIG. 1, multiple hypervideo controls, marks, and actions may be defined or overlayed at a singular point in a video or media file. With respect to the primary mark video file 20, for example, three hypervideo marks $M_2$ 30, $M_3$ 32, and $M_4$ 34 are defined at the same location in the primary video file subsequent to the death event $CP1_D$ 28 of the button control CP1. Similarly, multiple hypervideo controls, marks, and actions may be defined at the same location in secondary video or media files. Accordingly, a hypervideo application can be developed using a combination of hypervideo controls, marks, and actions to provide an intuitive and interactive video interface for inclusion in off-the-shelf software applications and for stand-alone applications.

Alternatively, a hypervideo interface or application may be developed as a fully scripted, non-interactive application, and as such, can provide a passive, "you-guide-me" navigation interface. Passive navigation is supported through the use of backbone video segments that are connected into a default path or sequence through the use of non-actuatable hypervideo controls, marks, and actions. For example, the hypothetical hypervideo application presenting documentaries of famous people as previously discussed with respect to FIG. 1 may be developed without including the user-actuatable button controls. Instead, a scripted hypervideo application that presents the documentaries in a predetermined manner may be developed using the appropriate hypervideo marks, actions, and functions as described in greater detail hereinbelow.

Hypervideo Mark Types

A mark video file, such as the primary mark video file 20 discussed hereinabove with respect to FIG. 1, typically includes several hypervideo marks associated with a wide variety of hypervideo actions. As presented in Table 1 hereinbelow, a hypervideo mark is generally classified as one of four types, including a control mark type, a video mark type, a transition type, and an other or miscellaneous mark type. Each distinct mark type is preferably identified by a unique numerical mark tag. A branch transition mark, such as the mark $M_1$ 26 discussed previously with respect to FIG. 1, is identified in Table 1 as mark type 13. It is noted that the nature and number of the hypervideo mark types, as well as the adopted naming convention, is provided for illustrative purposes only.

TABLE 1

| MARK TYPE | | | | | |
|---|---|---|---|---|---|
| | Control: | | | Video: | |
| 1 | = | Birth | 8 | = | Play |
| 2 | = | Adult | 9 | = | Stop |
| 3 | = | Retire | 10 | = | Open |
| 4 | = | Death | 11 | = | KPause |
| 5 | = | Move | 12 | = | SkipTo |
| 6 | = | Hide | 20 | = | MoveVideo |
| 7 | = | Show | 21 | = | HideVideo |
| | | | 22 | = | ShowVideo |
| | Transition: | | | Other: | |
| 13 | = | Branch | 18 | = | Cutpoint |
| 14 | = | BranchRetToFrame | 19 | = | UserDefined |
| 15 | = | BranchRetToCutpoint | | | |
| 16 | = | BranchNoRet | | | |
| 17 | = | Return | | | |

Mark Video File Structure

As discussed previously, each mark included in a hypervideo application is preferably defined within a mark video file having a pre-established data structure. A significant advantage of the hypervideo mark video file structure associated with one embodiment concerns the effective de-coupling of the audio/video signal information of a multimedia application from associated hypervideo mark video file information. In accordance with this embodiment, the data defined in a mark video file is maintained completely separate from the associated audio/video signal information constituting a video file or media file. For example, a multiplexed audio/visual file, such as one conforming to a Video for Windows® format, is preferably stored on the hard disk drive of a multimedia computer in a file having an .AVI extension. A hypervideo mark video file associated with the .AVI file is preferably stored in a separate file having a .MVI extension on the hard disk drive. As such, the .AVI audio/video file and the .MVI mark video file are physically distinct files residing in physically distinct locations on the computer's hard disk drive.

The de-coupling of the audio/video file and the mark video file advantageously simplifies the process of creating, composing, and editing a multimedia application. By way of example, it is assumed that a primary video file (PRIM.AVI) and two secondary media files (SEC1.AVI and SEC2.BMP) reside on the hard disk drive of a multimedia computer. It is noted that the PRIM.AVI and SEC1.AVI files are video files, and that the SEC2.BMP file is a bitmap file. Returning to the illustrative example, it is further assumed that audio/video component of the primary video segment on Nixon is contained in the primary video file PRIM.AVI, that the audio/video component of the secondary video file on the Nixon/Ford relationship is contained in the secondary video file SEC1.AVI, and that a graphic still image developed from a photograph of Gerald and Betty Ford on their wedding day is contained in the secondary video file SEC2.BMP. A primary mark video file 20 may then be created in accordance with the mark types and mark video file structure provided in Tables 1 and 2 to define the various hypervideo controls, marks, and actions depicted and discussed previously with respect to FIG. 1.

Enhanced editing and processing of a multimedia application is further provided in one embodiment in which hypervideo mark video files are created and stored in an ASCII format. As such, a hypervideo application may easily be created and modified by simply accessing the ASCII mark video file using a conventional wordprocessor, and then making appropriate changes or additions to the data elements contained in the pre-established mark video file structure.

It is noted that a conventional digital video editing system typically integrates a video signal portion, an associated audio portion, and an associated data signal portion into a composite multiplexed multimedia signal or bitstream. As such, the data signal portion is interleaved or integrally combined with the associated audio and video signal portions to produce the multiplexed multimedia signal or bitstream. In order to modify the data signal portion of a conventional multiplexed multimedia signal, the conventional video editing system must generally create a new version of either the affected portion of the multimedia application or completely reconstruct the multimedia application in order to integrate the modified data information with the associated audio and video information.

Depicted hereinbelow in Table 2 is one embodiment of a mark file data structure for defining a hypervideo mark. The mark file structure presented in Table 2 represents the mark data associated with the birth lifecycle event of a hypervideo control, such as the birth event $CP1_B$ 22 for the button control CP1 discussed previously with respect to FIG. 1.

TABLE 2

| BIRTH MARK FILE STRUCTURE | |
|---|---|
| 1 frm | < 1 = tag for Birth; frm = frame to process mark > |
| { | |
| cid | < cid = Control ID of the control > |
| x  y | < X and Y coordinates of the upper left corner > |
| visible | < 1 = visible; 0 = transparent > |
| clickable | < 1 = clickable; 0 = not clickable > |
| use_cutpoints | < 1 = use cutpoints; 0 = immediate > |
| z_order | < 1 = insert on top; 0 = insert on bottom > |

TABLE 2-continued

| BIRTH MARK FILE STRUCTURE | |
|---|---|
| image1 | < Childhood image in up position > |
| image2 | < Childhood image in down position > |
| image3 | < Adulthood image in up position > |
| image4 | < Adulthood image in down position > |
| image5 | < Retirement image in up position > |
| image6 | < Retirement image in down position > |
| image7 | < Selected image (only used if use_cutpoints = 1) > |
| tag data | < tag = action tag; data = data associated with tag > |
| } | |

Referring now in detail to Table 2 above, the first data element indicated as "1" identifies the mark type in accordance with the mark types presented in Table 1 hereinabove. The second data element shown as "frm" identifies the video frame number at which the hypervideo action (control birth) will be initiated. Following the mark tag number and associated frame number, various parameters that define the functionality of the hypervideo control are defined. The data element "cid" defines the identification number of the hypervideo control. The "cid" number of a control preferably corresponds to the order of a mark relative to other marks contained in the same mark video file. For example, a first mark defined in a mark video file containing fifty mark files will typically be identified with a cid number of 1. The eighth mark defined in the same mark video file will typically be identified with a cid number of 8.

The data elements "x" and "y" define the location of the control in the interface with respect to the upper left corner of the interface display. The "visible" data element can be toggled between a visible state and a transparent state by entering a "1" or a "0" 15 into the visible data element, respectively. The hypervideo control may be defined to be either clickable (i.e., mouse activatable) or not clickable by appropriately setting the "clickable" data element respectively to "1" or "0". A cutpoint may be defined for the particular control at a desired frame number by setting the use_cutpoints data element to a "1." Setting the use_cutpoints data element to a "0" causes the action associated with the control to be executed upon immediate actuation of the control.

As previously mentioned, multiple controls, marks, and actions may be defined for the same frame number. As such, a user may select the layering order of the controls by setting the z_order data element to a "1" to insert the displayed control on top of other 30 controls, or, alternatively, set the z_order data element to a "0" to insert the control on the bottom of previously displayed controls. The orientation and identification of image files associated with the childhood, adulthood, and retirement lifecycle phases of a control are defined as image identification information for images 1–6 as shown in Table 2. The information associated with image 7 is pertinent only when a cutpoint has been defined for the mark by setting the use_cutpoints data element to "1." Other data associated with a particular mark is preferably defined as the last data element in the mark file structure.

The data element information associated with the other hypervideo mark types presented in Table 1 are provided below in Table 3.

TABLE 3

| MARK TYPE | MARK DATA | DESCRIPTION |
|---|---|---|
| ADULT MARK | 2 frm { cid } | < 2 = tag for Adult > <br> < frm = frame to process mark > <br> < cid = Control ID of the control > |
| RETIRE MARK | 3 frm { cid } | < 3 = tag for Retire > <br> < frm = frame to process mark > <br> < cid = Control ID of the control > |
| DEATH MARK | 4 frm { cid } | < 4 = tag for Death > <br> < frm = frame to process mark > <br> < cid = Control ID of the control > |
| MOVE MARK | 5 frm { cid x y } | < 5 = tag for Move > <br> < frm = frame to process mark > <br> < cid = Control ID of the control > <br> < X coordinate upper left corner > <br> < Y coordinate upper left corner > |
| HIDE MARK | 6 frm { cid } | < 6 = tag for Hide > <br> < frm = frame to process mask > <br> < cid = Control ID of the control > |
| SHOW MARK | 7 frm { cid } | < 7 = tag for Show > <br> < frm = frame to process mark > <br> < cid = Control ID of the control > |
| PLAY MARK | 8 frm { } | < 8 = tag for Play > <br> < frm = frame to process mark > |
| STOP MARK | 9 frm { } | < 9 = tag for Stop. > <br> < frm = frame to process mark > |
| OPEN MARK | 10 frm { } | < 10 = tag for Open > <br> < frm = frame to process mark > |
| PAUSE MARK | 11 frm { dur } | < 11 = tag for Pause > <br> < frm = frame to process mark > <br> < dur = duration of pause in milliseconds > |
| SKIPTO MARK | 12 frm { to_frm } | < 12 = tag for SkipTo > <br> < frm = frame to process mark > <br> < to_frm = frame to skip to > |
| MOVE VIDEO MARK | 20 frm ( x y w h ) | < 20 = tag for MoveVideo > <br> < frm = frame to process mark > <br> < new x coordinate upper left corner > <br> < new y coordinate upper left corner > <br> < new width w of the video window > <br> < new height h of the video window > |
| HIDE VIDEO MARK | 21 frm { } | < 21 = tag for HideVideo > <br> < frm = frame to process mark > |
| SHOW VIDEO MARK | 22 frm { } | < 22 = tag for ShowVideo > <br> < frm = frame to process mark > |
| BRANCH MARK | 13 frm { mark_file dest_frm } | < 13 = tag for Branch > <br> < frm = frame to process mark > <br> < mark_file = name of the mark file > <br> < dest_frm = destination frame in the mark file > |
| BRANCH RETURN TO FRAME MARK | 14 frm { mark_file dest_frm ret_frm } | < 14 = tag for BranchRetToFrame > <br> < frm = frame to process mark > <br> < mark_file = name of the mark file > <br> < dest_frm = destination frame in the mark file > <br> < ret_frm = frame to return to > |
| BRANCH RETURN TO CUTPOINT MARK | 15 frm { mark_file dest_frm } | < 15 = tag for BranchRetToCutpoint > <br> < frm = frame to process mark > <br> < mark_file = name of the mark file > <br> < dest_frm = destination frame in the mark file > |
| BRANCH NO RETURN MARK | 16 FRM { mark_file dest_frm } | < 16 = tag for BranchNoRet > <br> < frm = frame to process mark > <br> < mark_file = name of the mark file > <br> < dest_frm = destination frame in the mark file > |
| RETURN MARK | 17 frm { } | < 17 = tag for Return > <br> < frm = frame to process mark > |
| CUTPOINT MARK | 18 frm { } | < 18 = tag for CutPoint > <br> < frm = frame to process mark > |
| USER-DEFINED MARK | 19 frm { type } | < 19 = tag for UserDefined > <br> < frm = frame to process mark > |

The data elements defining a mark file and the organization of the mark file structure may be modified to accommodate attributes and functionality different from that described with respect to the hypervideo birth mark depicted in Table 2. The mark video file structure illustrated in Table 4 hereinbelow, for example, represents an expanded mark file structure for defining a hypervideo birth mark.

TABLE 4

MARK INFORMATION

Birth Mark:

| | |
|---|---|
| (2 bytes) | Control ID |
| (2 bytes each) | X, Y (As offsets from the control region's upper left corner) |
| (2 bytes each) | Width, Height |
| (2 bits) | Display state <br> 00 = IMAGE <br> 01 = TEXT <br> 10 = TRANSPARENT <br> 11 = DEFAULT |
| (1 bit) | Clickable <br> 0 = NO <br> 1 = YES |
| (2 bits) | Destination Type <br> 00 = Go Back <br> 01 = Video <br> 10 = Page <br> 11 = UNDEFINED |
| (3 bits) | Effect <br> 000 = NONE <br> 001 = EFFECT1 (i.e. Fade) <br> 010 = EFFECT2 (i.e. Flash) <br> 011 = EFFECT3 (i.e. Color change) <br> 100 = EFFECT4 (i.e. Zoom) |
| (4 bytes each) | Adult Frame, Old Age Frame, Death Frame |
| (2 bytes) | Text Length (n) |
| (n bytes) | Text (used as image file name or control text based on Display Type) |
| (2 bytes) | Place Length (p) |
| (p bytes) | String representing place (data contained within string depends on Destination type) |

It is noted that the mark file structure of Table 4 includes most of the data elements of Table 2 in addition to other data elements. In particular, a "display state" data element is included in which one of four states may be defined for a particular hypervideo control. Also, a "destination type" data element provides information for branching or transitioning between video files and media files. For example, setting the destination type data element to "01" indicates a branch transition to another video file, while setting the destination type to "10" indicates a branch transition to a page of a text file or combined text/graphics file. Setting the destination type to "00" indicates a RETURN transition to an earlier branch transition location, which is typically the previous branch transition location.

Other hypervideo mark attributes may be defined by appropriately setting the "effect" data element to one of five states. For example, a fade transition effect may be prescribed by setting the "effect" data element to "001." Those skilled in the art will appreciate that various other mark file configurations and data elements may be desirable depending on a particular hypervideo application environment. Accordingly, a hypervideo application developer can enhance the functionality and characteristics of a hypervideo control by modifying or adding definable data elements to a mark file structure.

Figure 8:
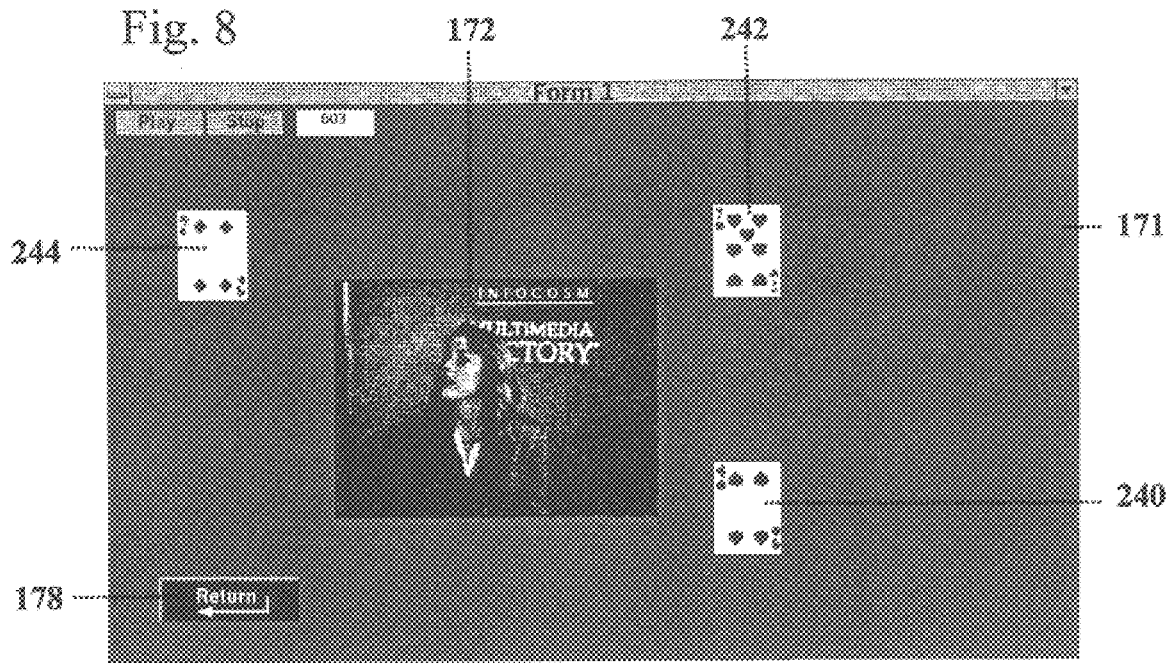
FIG. 8 is an illustration of a hypervideo GUI interface in which a primary video file is presented in a primary video window concurrently with the progressive displaying and removing of hypervideo button controls presented in individual secondary video windows in accordance with prescribed lifecycle phases and events defined for each of the displayed hypervideo controls.

By way of further example, and with reference to Table 5 hereinbelow and FIG. 8, the interaction between mark files contained in a mark video file and corresponding video and media files will be described. In FIG. 8, there is illustrated a hypervideo interface 171 including a primary video window 172 within which is displayed a primary video file. Also, shown in FIG. 8 are three playing card images 240, 242, and 244 which, as discussed hereinbelow with reference to Table 5, constitute hypervideo controls each having distinct lifecycle phases. The mark video file information presented in Table 5, when processed by a multimedia computer or other computer-based system, effectuates the presentation of the primary video file in the primary video window 172 concurrently with the sequential birth and death of each of the hypervideo playing card button controls 240, 242, and 244, in addition to other button controls not shown in FIG. 8.

TABLE 5

| | | |
|---|---|---|
| 1. C:\VIDEOS\KBDIG03.AVI | MCI (Media Controller Interface) Element Name | |
| 2. USER | User Mark | |
| 3. 0 −1 | | |
| { | | |
| 4. G:\TEMPHV\KBBTNRTN.BMP | | |
| 5. G:\TEMPHV\KBCRD04.BMP | | |
| 6. G:\TEMPHV\KBCRD07.BMP | | |
| 7. G:\TEMPHV\KBCRD042.BMP | | |
| 8. G:\TEMPHV\KBCRD01.BMP | | |
| 9. G:\TEMPHV\KBCRD05.BMP | | |
| } | | |
| 10. 20 0 { 235 152 320 240 } | Move Video | |
| 11. 1  0 | Control Birth (Return Button Control) | |
| { | | |
| 12. 1 | | |
| 13. 330 417 | | |
| 14. 1 1 0 1 | | |
| 15. G:\TEMPHV\KBBTNRTN.BMP | | |
| 16. G:\TEMPHV\KBBTNRTN.BMP | | |
| 17. G:\TEMPHV\KBBTNRTN.BMP | | |
| 18. G:\TEMPHV\KBBTNRTN.BMP | | |
| 19. G:\TEMPHV\KBBTNRTN.BMP | | |
| 20. G:\TEMPHV\KBBTNRTN.BMP | | |
| 21. G:\TEMPHV\KBBTNRTN.BMP | | |
| 22. 17 | | |
| } | | |
| 23. 5 550 { 1 50 455 } | Move Control (Return Button Control) | |
| 24. 1 550 | Control Birth (4 of Spades Button Control) | |
| { | | |
| 25. 2 | | |
| 26. 615 340 | | |
| 27. 1 0 0 1 | | |
| 28. G:\TEMPHV\KBCRD04.BMP | | |
| 29. G:\TEMPHV\KBCRD04.BMP | | |
| 30. G:\TEMPHV\KBCRD04.BMP | | |
| 31. G:\TEMPHV\KBCRD04.BMP | | |
| 32. G:\TEMPHV\KBCRD04.BMP | | |
| 33. G:\TEMPHV\KBCRD04.BMP | | |
| 34. G:\TEMPHV\KBCRD04.BMP | | |
| 35. 0 | | |
| } | | |
| 36. 1 575 | Control Birth (7 of Hearts Button Control) | |
| { | | |
| 37. 3 | | |
| 38. 615 75 | | |

TABLE 5-continued

| | | |
|---|---|---|
| 39. 1 0 0 1 | | |
| 40. G:\TEMPHV\KBCRD07.BMP | | |
| 41. G:\TEMPHV\KBCRD07.BMP | | |
| 42. G:\TEMPHV\KBCRD07.BMP | | |
| 43. G:\TEMPHV\KBCRD07.BMP | | |
| 44. G:\TEMPHV\KBCRD07.BMP | | |
| 45. G:\TEMPHV\KBCRD07.BMP | | |
| 46. G:\TEMPHV\KBCRD07.BMP | | |
| 47. 0 | | |
| } | | |
| 48. 1 600 | Control Birth (4 of Diamonds Button Control) | |
| { | | |
| 49. 4 | | |
| 50. 70 75 | | |
| 51. 1 0 0 1 | | |
| 52. G:\TEMPHV\KBCRD42.BMP | | |
| 53. G:\TEMPHV\KBCRD42.BMP | | |
| 54. G:\TEMPHV\KBCRD42.BMP | | |
| 55. G:\TEMPHV\KBCRD42.BMP | | |
| 56. G:\TEMPHV\KBCRD42.BMP | | |
| 57. G:\TEMPHV\KBCRD42.BMP | | |
| 58. G:\TEMPHV\KBCRD42.BMP | | |
| 59. 0 | | |
| } | | |
| 60. 1 618 | Control Birth (Ace of Spades Button Control) | |
| { | | |
| 61. 5 | | |
| 62. 70 340 | | |
| 63. 1 0 0 1 | | |
| 64. G:\TEMPHV\KBCRD01.BMP | | |
| 65. G:\TEMPHV\KBCRD01.BMP | | |
| 66. G:\TEMPHV\KBCRD01.BMP | | |
| 67. G:\TEMPHV\KBCRD01.BMP | | |
| 68. G:\TEMPHV\KBCRD01.BMP | | |
| 69. G:\TEMPHV\KBCRD01.BMP | | |
| 70. G:\TEMPHV\KBCRD01.BMP | | |
| 71. 0 | | |
| } | | |
| 72. 1 690 | Control Birth (5 of Clubs Button Control) | |
| { | | |
| 73. 6 | | |
| 74. 370 420 | | |
| 75. 1 0 0 1 | | |
| 76. G:\TEMPHV\KBCRD05.BMP | | |
| 77. G:\TEMPHV\KBCRD05.BMP | | |
| 78. G:\TEMPHV\KBCRD05.BMP | | |
| 79. G:\TEMPHV\KBCRD05.BMP | | |
| 80. G:\TEMPHV\KBCRD05.BMP | | |
| 81. G:\TEMPHV\KBCRD05.BMP | | |
| 82. G:\TEMPHV\KBCRD05.BMP | | |
| 83. 0 | | |
| } | | |
| 84. 4 750 { 2 } | Control Death (4 of Spades Button Control | |
| 85. 4 750 { 3 } | Control Death (7 of Hearts Button Control | |
| 86. 4 750 { 4 } | Control Death (4 of Diamonds Button Control | |
| 87. 4 750 { 5 } | Control Death (Ace of Spades Button Control) | |
| 88. 4 750 { 6 } | Control Death (5 of Clubs Button Control | |
| 89. 17 1265 { } | Return | |

Figure 5:
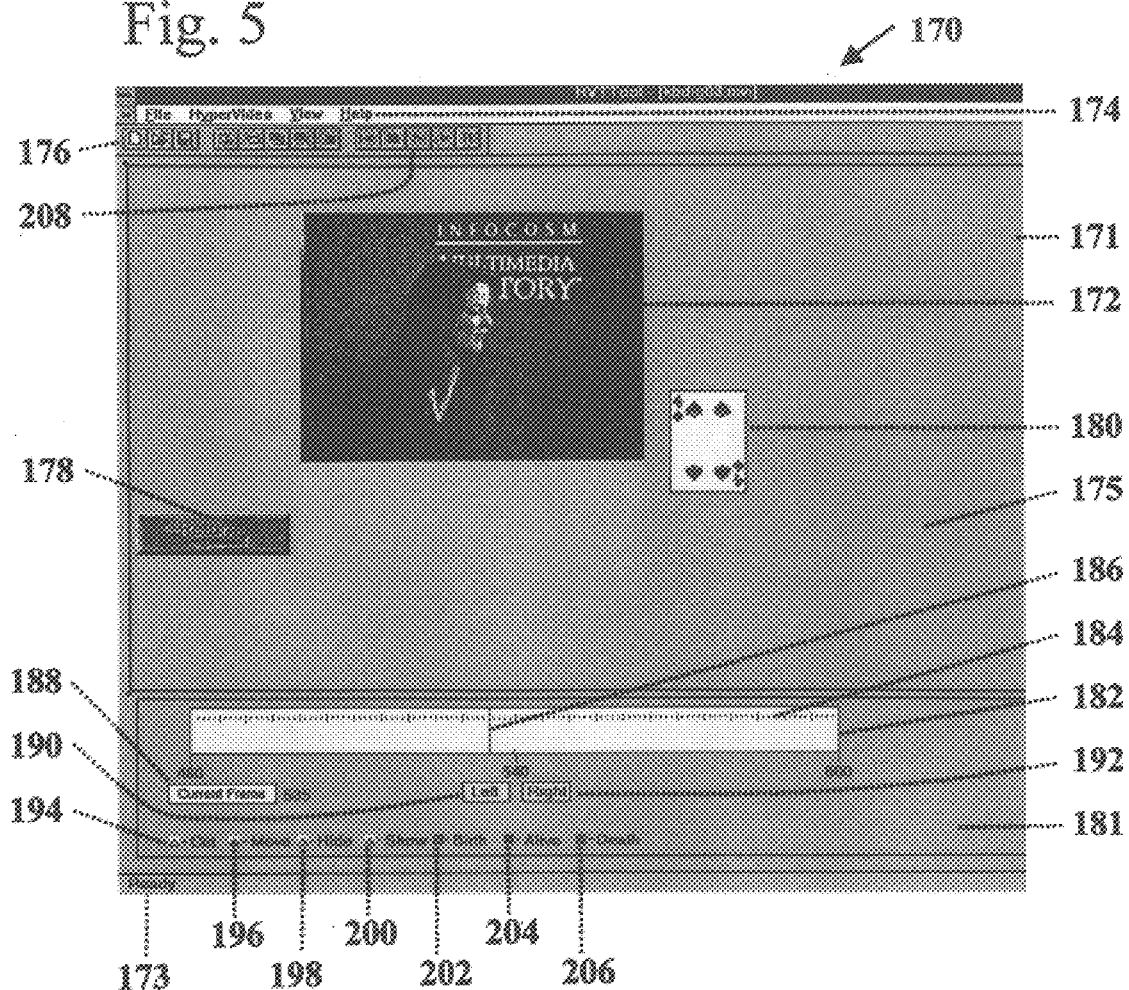
FIG. 5 is an illustration of a graphical-user-interface of a novel hypervideo editing system that facilitates rapid, real-time composing and editing of a hypervideo application.
Figure 6:
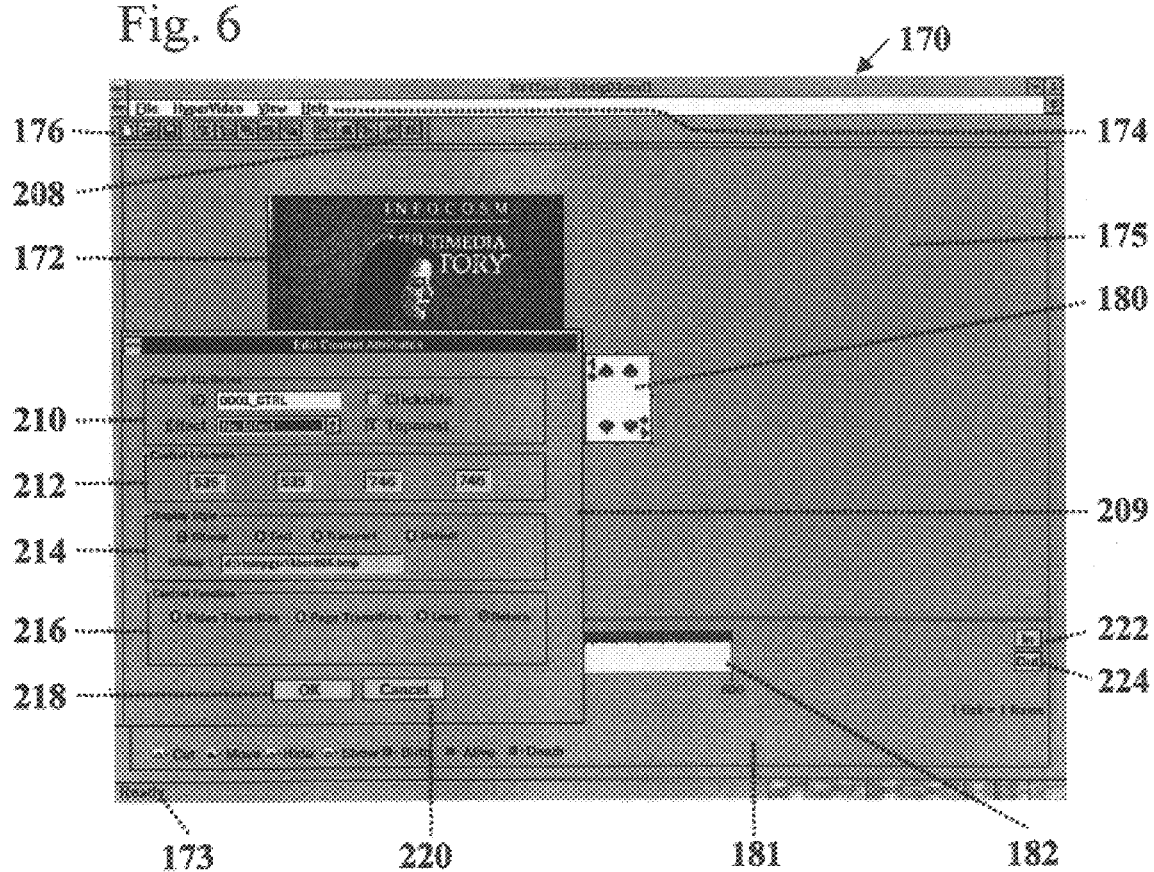
FIG. 6 is an illustration of the novel hypervideo GUI interface of FIG. 5 further showing various user-editable control attributes associated with a novel hypervideo control.

Referring now in detail to Table 5, the first statement in the mark video file of the hypervideo application includes a path name to the storage location of the primary video file identified as KBDIGO3.AVI. The primary video file, a frame of which is illustrated in FIG. 8 and in FIGS. 5–6, is presented in the primary video window 172. The primary mark video file (*.MVI file) depicted in Table 5 contains mark files for fourteen individual marks of the type described previously with respect to Table 1 that orchestrate the presentation of the multimedia application illustrated in FIG. 8. In particular, the following marks defined in Table 5 above are identified in Table 6 below by line number as follows:

TABLE 6

| | |
|---|---|
| 1. | A Move Video Mark starting at line 10 of Table 5; |
| 2. | A Control Birth Mark (Return Button Control) starting at line 11; |
| 3. | A Move Control Mark (Return Button Control) at line 23; |
| 4. | A Control Birth Mark (4 of Spades Button Control) starting at line 24; |
| 5. | A Control Birth Mark (7 of Hearts Button Control) starting at line 36; |
| 6. | A Control Birth Mark (4 of Diamonds Button Control) starting at line 48; |
| 7. | A Control Birth Mark (Ace of Spades Button Control) starting at line 60; |
| 8. | A Control Birth Mark (5 of Clubs Button Control) starting at line 72; |
| 9. | A Control Death of Mark cid = 2 (4 of Spades Button Control) at line 84; |
| 10. | A Control Death of Mark cid = 3 (7 of Hearts Button Control) at line 85; |
| 11. | A Control Death of Mark cid = 4 (4 of Diamonds Button Control) at line 86; |
| 12. | A Control Death of Mark cid = 5 (Ace of Spades Button Control) at line 87; |
| 13. | A Control Death of Mark cid = 6 (5 of Clubs Button Control) at line 88; and |
| 14. | A Return Mark at line 89. |

Referring now in detail to the mark video file shown in Table 5 hereinabove, the primary video file KBDIGO3.AVI is read into the system memory (RAM) of a multimedia computer and subsequently played in the primary video window 172 within the hypervideo interface 171 at line 1 of Table 5. Pointers to the storage locations of the bitmap files defining the playing card button controls are established in system memory at lines 2–9. At line 10, the primary video window 172 is moved to a specified location in the display interface 171 at frame 0 upon execution of the Move Video Mark. The width and height dimensions of the primary video window 172 are also defined at line 10. More particularly, the primary video window 172 is moved to display interface coordinates x=235 and y=152, and displayed in the primary video window 172 having a width dimension of w=320 and a height dimension of h=240. It is noted that the x, y, w, and h parameters associated with the Move Video mark are expressed in terms of pixel units.

The mark file data associated with the Return Button Control 178 birth mark is indicated at lines 11–22. At line 11, the control birth of the Return Button Control 178, indicated as having a mark type number of "1," is initiated at frame 0 of the primary video file KBDIGO3.AVI. The Return Button Control 178 is assigned a mark identification number of cid=1 at line 12, and the location for displaying the Return Button Control 178 is defined as interface coordinates x=330 and y=417. As indicated at line 14, the displayed Return Button Control 178 is visible (visible=1), clickable (clickable=1), displayed immediately (use_cutpoints=0), and inserted on top of any other control displayed at equivalent x and y interface coordinates (z_order=1). The bitmap file associated with the Return Button Control 178, identified as KBBTNRTN.BMP, is displayed at lines 15–21, which describe the pointer locations from which the Return Button Control 178 bitmap files are to be retrieved. It is noted that the bitmap images associated with the childhood, adulthood, and retirement lifecycle phases for the Return Button Control 178 are the same in this example. It is further noted that transitional effects and appearance modifications associated with the childhood and retirement lifecycle phases of a control are effectuated by pointing to the appropriate media files displaying same in a manner similar to that indicated at lines 15–21.

At line 23 of Table 5, a Move Control Mark for the Return Button 178 is executed at frame 550. The bracketed data following the frame 550 identification indicates that the Return Button Control 178 is moved to new interface display coordinates of x=50 and y=455. At line 24, the 4 of Spades Button Control 240 is initially displayed in the interface at frame 550. It is noted that the Move Control Mark of line 23 and the Control Birth Mark of line 24 are both defined to be executed at frame 550 of the primary video file KBDIG03.AVI. The mark data associated with the birth event for the 4 of Spades Button Control 240 is set forth in lines 25–35. At line 25, the 4 of Spades Button Control 240 is assigned a mark identification number of ID=2. The 4 of Spades Button Control 240 is initially displayed at display interface coordinates of x=615 and y=340. As indicated at line 27, the 4 of Spades Button Control 240 is defined as being visible (visible=1), not clickable (clickable=0), actuatable immediately (use_cutpoints=0), and inserted on the bottom of any other control displayed at the same x and y interface coordinates (z_order=1). The bitmap display images corresponding to the 4 of Spades Button Control 240 for all its lifecycle phases are defined at lines 28–34.

In a similar manner, the mark video data associated with the birth of the 7 of Hearts Button Control 242, the 4 of Diamonds Button Control 244, the Ace of Spades Button Control (not shown) and the 5 of Clubs Button Control (not shown) are defined at lines 36–83 of Table 5. At lines 84–88, each of the playing card button controls is removed from the display interface 171 as indicated by the death events of each control identified by cid number within the associated brackets. Finally, at line 89, a Return Mark is executed upon reaching frame 1265.

HYPERVIDEO EDITOR

Referring now to FIGS. 4(a) and 4(b), there is illustrated one embodiment of a hypervideo editor including a stand-alone computer system 130 and a separate video playback system 150. The computer system 130 preferably includes a wordprocessing capability. In the embodiment illustrated in FIGS. 4(a) and 4(b), a user initiates a hypervideo application composition session by playing a video segment on the video playback system 150, with individual frame numbers of the video segment being displayed on a video frame number display 156. The presentation of the video segment is preferably manipulated by actuation of several VCR-type controls provided on a control panel 152, which includes a forward control 158, a reverse control 160, a stop control 162, and a pause control 164. Preferably, the forward and reverse controls 158 and 160 permit frame-by-frame progression in a forward and reverse direction, respectively. When a desired frame number is reached, as indicated in the video frame number display 156, a mark file associated with the displayed video frame is created or edited using the wordprocessing capability of the computer system 130.

The computer system 130 typically includes a personal computer 132 coupled to a display 136 and an input device 134, such as a keyboard and a mouse. A mass storage device 140, coupled to the personal computer 132, is employed for storing hypervideo control information files. Video, audio, and other information files are also stored on the mass storage device 140.

In the embodiment illustrated in FIG. 4(c), one or more mark video files 138 are preferably stored on the mass storage device 140, such as a hard disk drive internal to the personal computer 132. Requested mark video files 138 are transferred between the mass storage device 140 and the system memory (RAM) of the personal computer 132 during the editing process. Various hypervideo marks, controls, and actions are preferably defined in accordance with a pre-established mark file data structure as discussed previously with respect to Tables 1–4.

Generally, a hypervideo interface or application includes a backbone or primary video file which includes a number of hypervideo marks, controls, and actions. All of the marks associated with a particular video file are preferably stored in a distinct mark video file (*.MVI file) on the mass storage device 140, such as the primary mark video file $MVF_1$ shown in FIG. 4 (c). Secondary media files or clips associated with a primary video file $MVF_1$ by branch transition marks or other marks have associated with them their own individual mark video files, such as $MVF_2$ and $MVF_3$, for example. It is noted that the hypervideo interface editing system illustrated in FIGS. 4(a)–4(c) represents a somewhat primitive but effective means for composing a hypervideo application.

Referring now to FIGS. 5–7 and 9, there is illustrated another embodiment of an interactive hypervideo editing system intended to facilitate rapid, interactive development of hypervideo applications and interfaces. The hypervideo editor 170 preferably includes an intuitive GUI interface 171 with which hypervideo documents can be interactively created and edited. Both editing and playing functionality is preferably supported by the hypervideo editor 170. The GUI interface 171 is preferably similar in appearance and basic functionality to other common Windows® application interfaces.

The GUI interface 171 of the hypervideo editor 170 is preferably based on the Microsoft® Multi-Document Interface (MDI) specification to support simultaneous editing of multiple hypervideo documents. The GUI interface 171 preferably includes an editor MDI window 175 and a ruler area 181. Each hypervideo document, such as one that includes a video clip or text/graphics file, is preferably displayed in its own child video window within the editor MDI window 175. During composition, the window of each document preferably displays the title of the document in the title bar.

A ruler area 181 is preferably displayed across the bottom of the GUI interface 171 and contains the ruler 182 and several ruler related controls. The state of the ruler 182 is preferably updated as the state of the hypervideo document changes. In addition, the GUI interface 171 preferably includes a tool bar menu 176, a menu bar 174, and a status bar 173, which are preferably similar in appearance to those found in other Windows® applications.

The GUI interface 171 preferably supports traditional Windows® controls including buttons, bitmaps, labels, and hotspots. During hypervideo application composition, the controls are preferably displayed as they would during playback. Interaction with the GUI interface 171 is preferably accomplished using a mouse with functionality substantially similar to that provided in other Windows® applications. For example, a single click on a control with the left mouse button preferably selects the control for re-sizing. Handles appear in the editor MDI window 175 which can be grabbed and dragged by the mouse to re-size the control. When the cursor is positioned over a handle, the cursor preferably changes in form to an arrow representing valid re-size movements. The status bar 173 preferably displays the new width and height dimensions of the re-sized control as they are changed.

By way of further example, a single click and hold on a control with the left mouse button preferably enables selective movement of the control for moving. The cursor preferably changes to cross-hairs to indicate the action. The status bar 173 preferably displays the new coordinates of the control as they are changed. Further, a double click on a control with the left mouse button displays the control edit dialogue, which provides current control information to a user. Holding down the less-than key, for example, preferably allows the user to select multiple hypervideo controls on the current frame of the active document. These controls can then be deleted or copied to the clipboard.

Additional GUI interface 171 functionality permits a user to interact with the primary video window 172. A single click and hold with the left mouse button on the primary video window 172, for example, preferably permits moving of the video window 172 within the editor MDI window 175. The cursor preferably changes to cross-hairs to indicate this action. The status bar 173 preferably displays the new coordinates of a moving video window as its position is changed. By way of further example, a double click on the primary video window 172 with the left mouse button preferably displays the video edit dialogue with which a user can define and modify the attributes of a hypervideo control or mark. As shown in FIG. 6, the video edit dialogue 209 preferably includes a control attributes dialogue box 210, a control lifecycle dialogue box 212, a display style dialogue box 214, and a control function dialogue box 216. As discussed previously, the data elements contained in a mark file are preferably defined by clicking on the appropriate control attribute dialogue box and entering or clicking on the appropriate information.

With further reference to FIG. 6, a birth mark type has been selected for the first hypervideo control (cid=1) of a mark video file as indicated in the control attributes dialogue box 210. The lifecycle attributes of the control are definable using the control lifecycle dialogue box 212. It is noted that the birth and adult lifecycle events in the illustrative example shown in FIG. 6 are initiated at the same frame number, namely, frame 535. The retire and death lifecycle events are similarly executed at an equivalent, subsequent frame number, namely, frame 746. In this example, a bitmap has been selected as the display style, as indicated in the display style dialogue box 214. Finally, the control has been defined as a Return Button Control, as indicated in the control function dialogue box 216. It is noted that at the upper right corner of the ruler area 181 there is presented an In Button Control 222 and an Out Button Control 224, which can be activated to define the placement of a control respectively inside or outside of a particular window.

The ruler 182 preferably displays a current frame indicator 186 that is updated as the video is played and manipulated. Clicking on the ruler 182 with the left mouse button, for example, causes the current frame indicator 186 and the document itself to progress in a forward or reverse direction to the frame corresponding to the position of the mouse location within the ruler 182. Further, clicking and dragging the mouse on the current frame indicator 186 preferably causes the document to advance and rewind in response to mouse movements.

Figure 7:
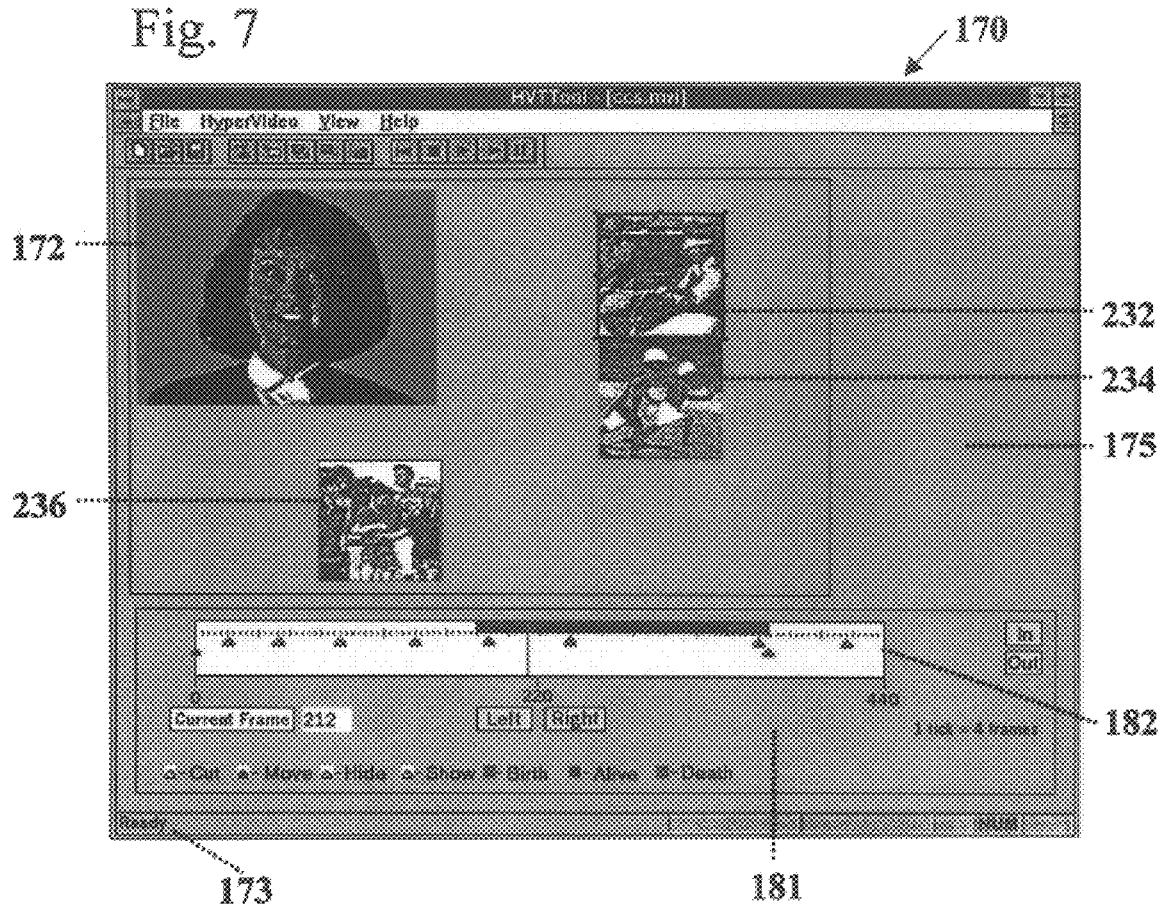
FIG. 7 is an illustration of a GUI interface of a hypervideo editing system in which a primary video file is presented in a primary video window concurrently with the presentation of three distinct secondary media files presented in three corresponding secondary video windows.

In one embodiment, the lifecycle stages of a selected control are graphically displayed on the ruler 182 as lines marking its birth, adult, retire, and death lifecycle events. These lines delineate the three phases of a control's lifecycle, including childhood, adulthood, and retirement phases. In another embodiment, as best illustrated in FIG. 7, the lifecycle attributes of a control are preferably displayed as a colored indicator bar along the upper portion of the ruler 182, with each phase being depicted by a different color. The values for these phases can be changed graphically by selecting a desired phase with the mouse and modifying its horizontal dimension to the desired frame value. Such modifications are valid only if they result in frame values that conform to the natural progression of the control's lifecycle as illustrated in FIG. 2. Invalid modifications preferably result in a beep or other error indication.

The hypervideo marks defined for all or a portion of a video file are preferably displayed on the ruler 182. The marks may be clicked and dragged to associate them with different frames if desired. Marks are preferably identified as different colors based on the actions with which they are associated. By default, a Move Video Mark is preferably added on the first frame of the video file, with an End of Video Mark (EOV) added on the last frame. These marks preferably cannot be moved, although double-clicking on them will permit the user to edit their values. Double-clicking on a branch transition mark, for example, will preferably bring up a dialogue where the user can edit the branch information, such as a target and return destination. Double-clicking on a Move Video Mark preferably brings up a dialogue to permit editing of the x, y, width, and height parameters of a video file associated with this mark. Further, double-clicking on a Move Control Mark preferably brings up a dialogue within which a user can edit the x and y coordinates of the control for this mark. When the current frame indicator 186 reaches the end of the ruler 182, the ruler 182 preferably scrolls such that the last frame becomes the first, thus allowing continuous tracking of the current frame indicator 186 when progressing in a forward and reverse direction through the currently displayed video document.

HYPERVIDEO SYSTEM ARCHITECTURE

Figure 9:
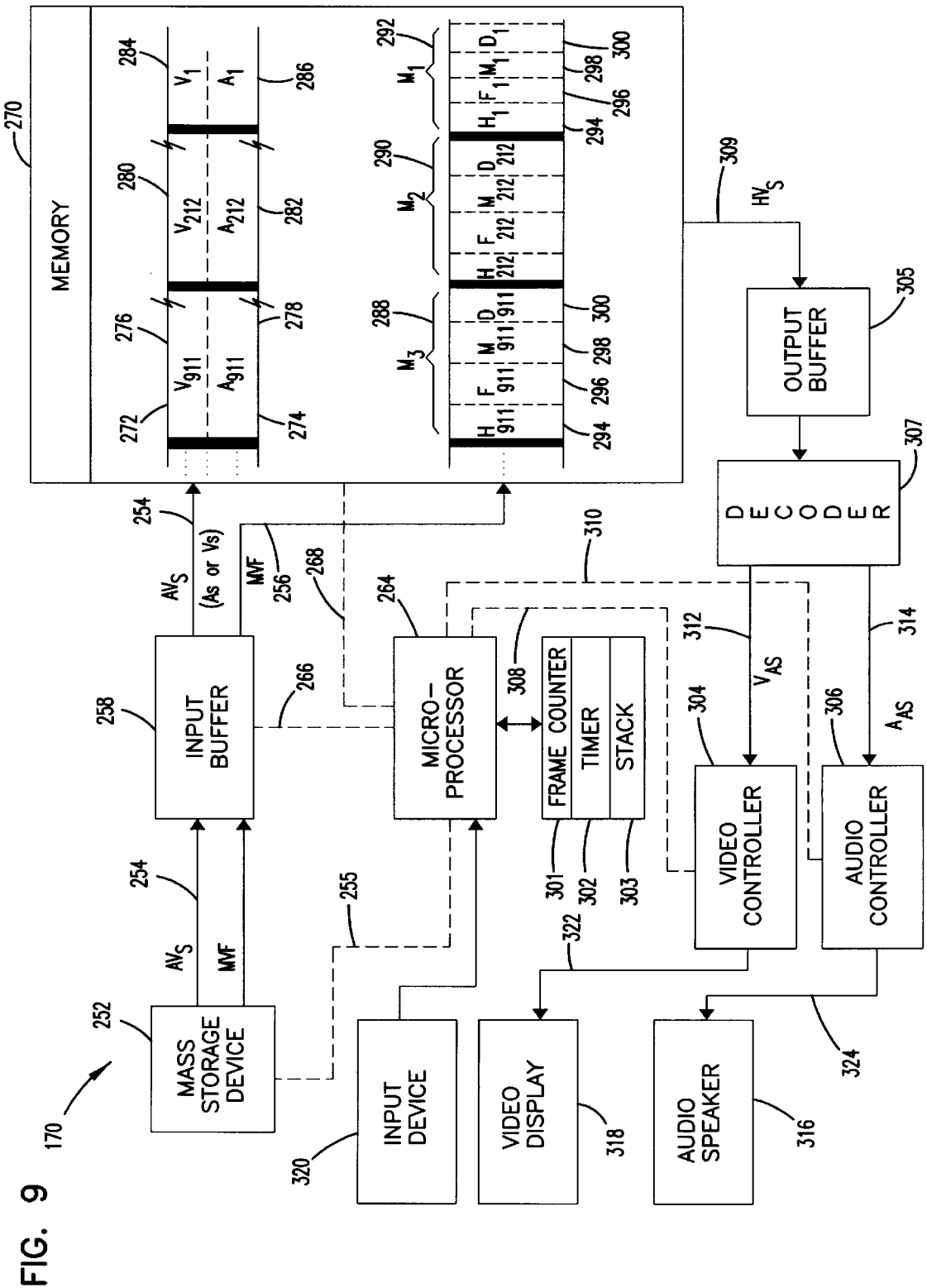
FIG. 9 is a system block diagram of a hypervideo editing and playback apparatus.

Referring now to FIG. 9, there is illustrated a block diagram of a hypervideo editing system 170 for composing and playing a hypervideo application or interface. In the embodiment shown in FIG. 9, the hypervideo system 170 preferably includes a mass storage device 252 for storing audio/video files, graphics files, text files, animation files, and other multimedia files in a digital format. The mass storage device 252 also provides storage of mark video files preferably in a ASCII format. In accordance with one embodiment, a multiplexed audio/video bitstream $AV_S$ 254, representative of either a primary or secondary video file, is transmitted from the mass storage device 252 to an input buffer 258 upon initiation of a hypervideo composition or playback session. Concurrently, a mark video file 256 associated with the audio/video segment $AV_S$ 254 is transferred from the mass storage device 252 to the input buffer 258. The input buffer 258 is provided to enhance synchronization of video segment portions $AV_S$ 254 and mark video files 256 when transferred from the mass storage device 252 to the system memory 270. It is noted that the bitstream $AV_S$ 254 stored on the mass storage device 252 may be representative of a pure audio bitstream, a pure video bitstream absent an audio component, or a multiplexed audio/video bitstream.

The system memory 270 is shown as storing a portion of the video file $AV_S$ 254 transferred from the mass storage device 252. For purposes of explanation, it is assumed that 911 frames of the video file $AV_S$ 254 are currently being processed by the hypervideo editor 170. The 911 frames may represent all or only a portion of the video file $AV_S$ 254. It is further assumed that three marks, $M_1$ 292, $M_2$ 290, and $M_3$ 288, contained in the mark video file MVF 256 have been respectively defined for video frames $V_1$ 284, $V_{212}$ 280 and $V_{911}$ 276 of the 911 frames. The audio segment portions associated with each of the video segments $V_1$ 284, $V_{212}$, 280 and $V_{911}$ 276 are depicted respectively as audio segments $A_1$ 286, $A_{212}$ 282, and $A_{911}$ 278. For purposes of this illustrative example, sequential video frames $V_2$ through $V_{211}$ following frame $V_1$ 284 and sequential video frames $V_{213}$ through $V_{910}$ following frame $V_{212}$ 280, as well as corresponding audio segments, are not shown.

The mark video file MVF 256 transferred from the mass storage device 252 to the memory 270 preferably contains all of the mark files defined for a particular video segment, such as a primary video file. In the illustrative example of FIG. 9, the mark video file currently residing in the memory 270 contains three video segments $V_1$ 284, $V_{212}$ 280, and $V_{911}$ 276 having associated marks $M_1$ 292, $M_1$ 290, and $M_3$ 288. As each of the frames $V_1$ 284, $V_{212}$ 280, and $V_{911}$ 276 are transferred to the memory 270, the data associated with corresponding marks $M_1$ 292, $M_2$ 290, and $M_3$ 288 are also loaded into memory 270, processed, and executed. The mark file $M_1$ 292 associated with video segment $V_1$ 284 and audio segment portion $A_1$ 286, for example, contains a header $H_1$ 294, a frame-ID $F_1$, a mark-ID $M_1$, and associated data $D_1$ 300. The microprocessor 264 cooperates with the memory 270 to interpret and process the information contained in the mark file $M_1$ 292 associated with the video frame $V_1$ 284. As discussed previously, the mark file $M_1$ 292 may be representative of a hypervideo control, a branch transition instruction to effect a branch to a secondary media file, or another hypervideo action.

The microprocessor 264 interprets the header, frame-ID, mark-ID, and data for each of the marks and executes the defined hypervideo action. For example, the microprocessor 264 effectuates the action defined in a Control Birth Mark for a particular frame by retrieving the specified bitmap file from memory 270 and integrating the bitmap file data with the audio and video frame data into a multiplexed multimedia bitstream $HV_S$ 309. Control signals are also produced by the microprocessor 264 and transmitted to the output buffer 305, decoder 307, and the audio and video controllers 304 and 306 to properly synchronize the presentation of the audio and video components of the multiplexed multimedia bitstream HVS 309 respectively on the video display 318 and audio speaker 316.

In accordance with the illustrative example, an interleaved hypervideo bitstream $HV_S$ 309, including audio and video information corresponding to frame $V_1$ 284 and corresponding mark information contained in the mark $M_1$ 292, is transferred from the memory 270 to an output buffer 305 and subsequently to a decoder 307. It is noted that the output buffer 305 is provided to enhance synchronization of a multiplexed hypervideo bitstream signal $HV_S$ 309 transmitted between the memory 270 and the decoder 307. The decoder 307 operates on the multiplexed digitized hypervideo bitstream signal $HV_S$ 309 by applying a suitable decompression algorithm to transform the hypervideo bitstream signal $HV_S$ 309 from a compressed digital format to a corresponding non-compressed analog format. The transformed analog video signal $V_{AS}$ 312 is transferred from the decoder 307 to a video controller 304, while the corresponding analog audio signal $A_{AS}$ 314 is transferred from the decoder 307 to an audio controller 306. A video image corresponding to video frame $V_1$ 284 and other video image data associated with the mark $M_1$ 292 are displayed on the video display 318. Concurrently, the audio segment $A_1$ 286 associated with the video frame $V_1$ 284, along with other audio information associated with the mark $M_1$ 292, are broadcast over the audio speaker 316. Having processed the audio/video information and mark information associated with the video frame $V_1$ 284, subsequent video and audio information associated with frames $V_2$ through $V_{211}$ are processed through the output buffer 305, decoder 307, and video and audio controllers 304 and 306, respectively, for presentation and broadcasting over the video display 318 and audio speaker 316.

When the microprocessor 264, in cooperation with the frame counter 301, processes video frame $V_{212}$ 280, the information contained in the mark file $M_2$ 290 is processed together with the audio information contained in audio segment portion $A_{212}$ 282 in a manner substantially similar to that described above with respect to video segment $V_1$ 284. It is noted that the frame counter 301 is incremented as each frame is transferred and processed in the memory 270. After processing the audio/video information and mark information associated with video frame $V_{212}$ 280, video frames $V_{213}$ through frame $V_{910}$ are subsequently processed.

For purposes of further illustration, it is assumed that the mark $M_3$ 288 associated with video frame $V_{911}$ 276 contains a branch action instruction. The microprocessor 264 processes the mark-ID $M_{911}$ 298 and corresponding data $D_{911}$ 300 and pushes onto the transition stack 303 information identifying frame $V_{911}$ of the primary video file $AV_S$ 254 as the branch initiation location. The identification of the frame number from which a branch instruction is initiated, in addition to the destination information of the video or media file associated with the branch mark, is preferably pushed onto the transition stack 303 for purposes of managing user-actuated and automatic navigation through a multimedia application. Transitioning from a secondary media file back to the original branch location associated with a return transition mark is accomplished by popping the frame number and media file identification information from the transition stack 303.

HYPERVIDEO APPLICATION COMPOSITION AND PLAYBACK METHODOLOGY

Figure 10:
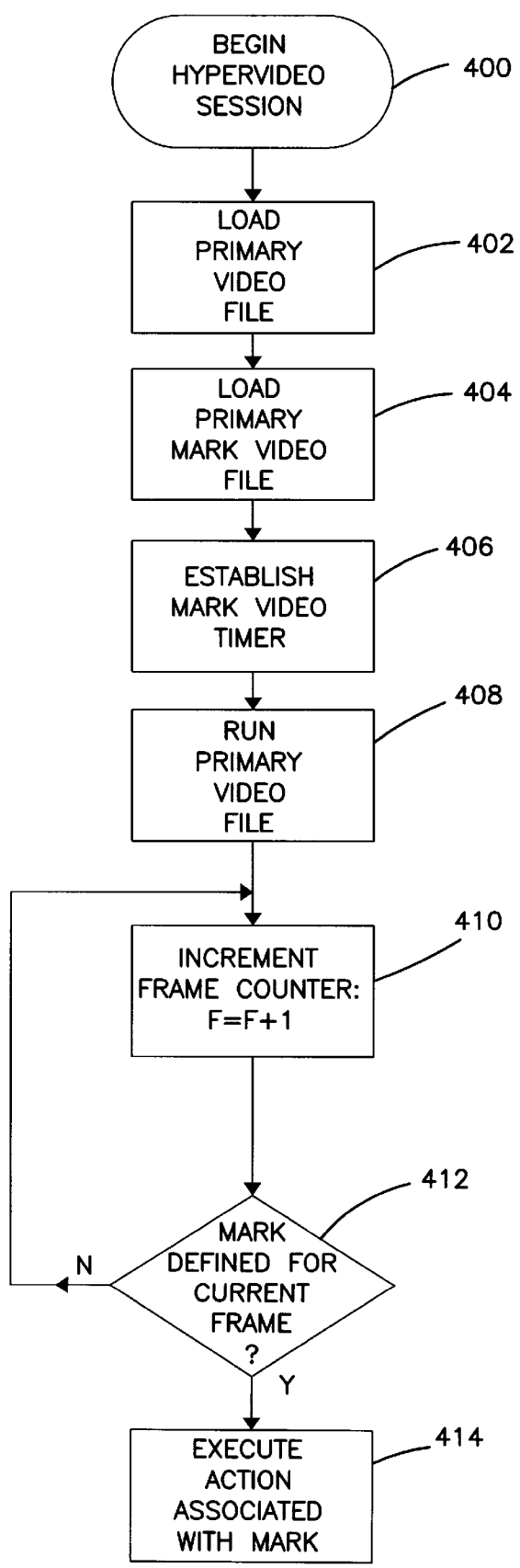
FIGS. 10–12 are flow diagrams describing various processing steps associated with the playback of a hypervideo application.
Figure 11:
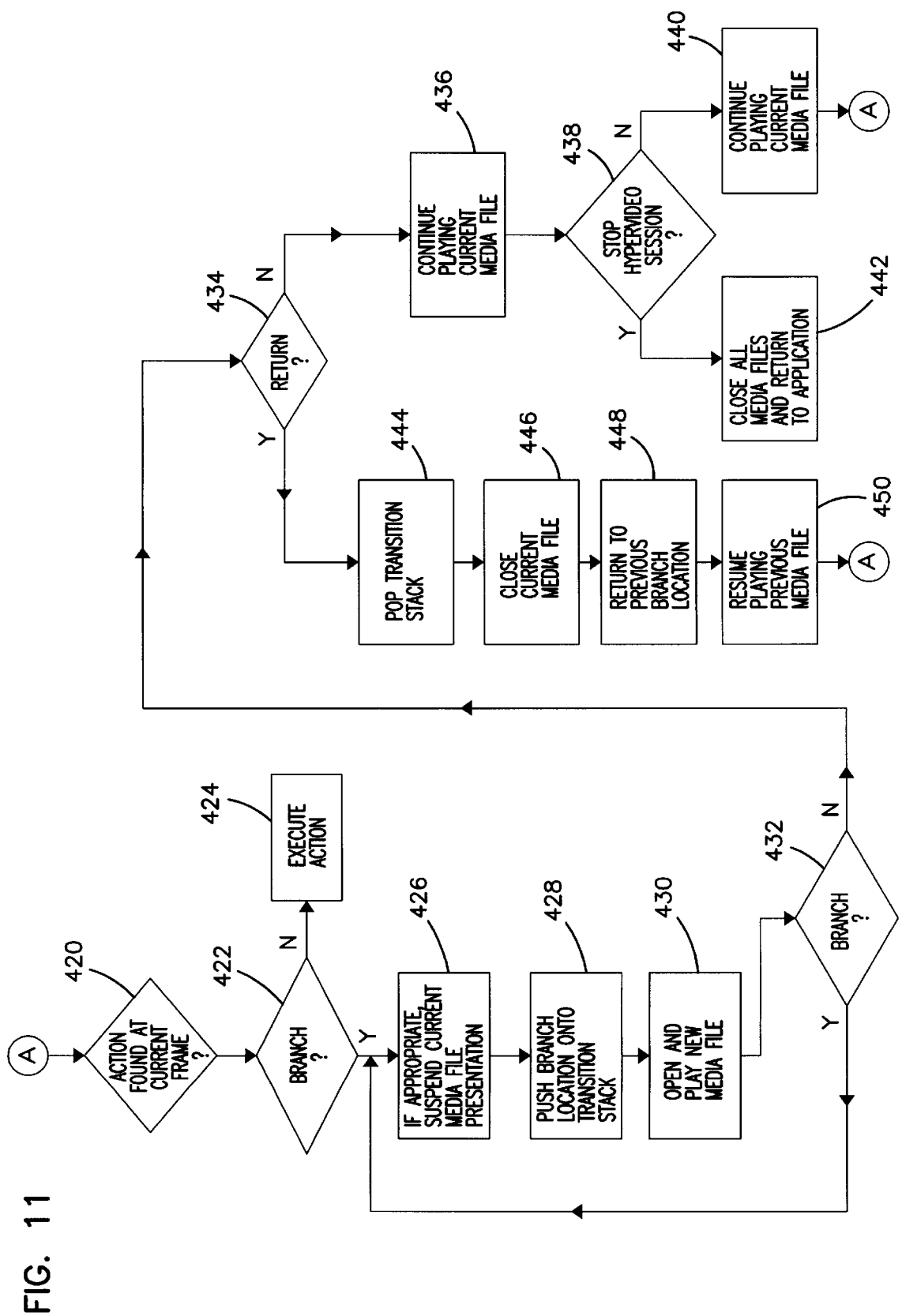
Figure 12:
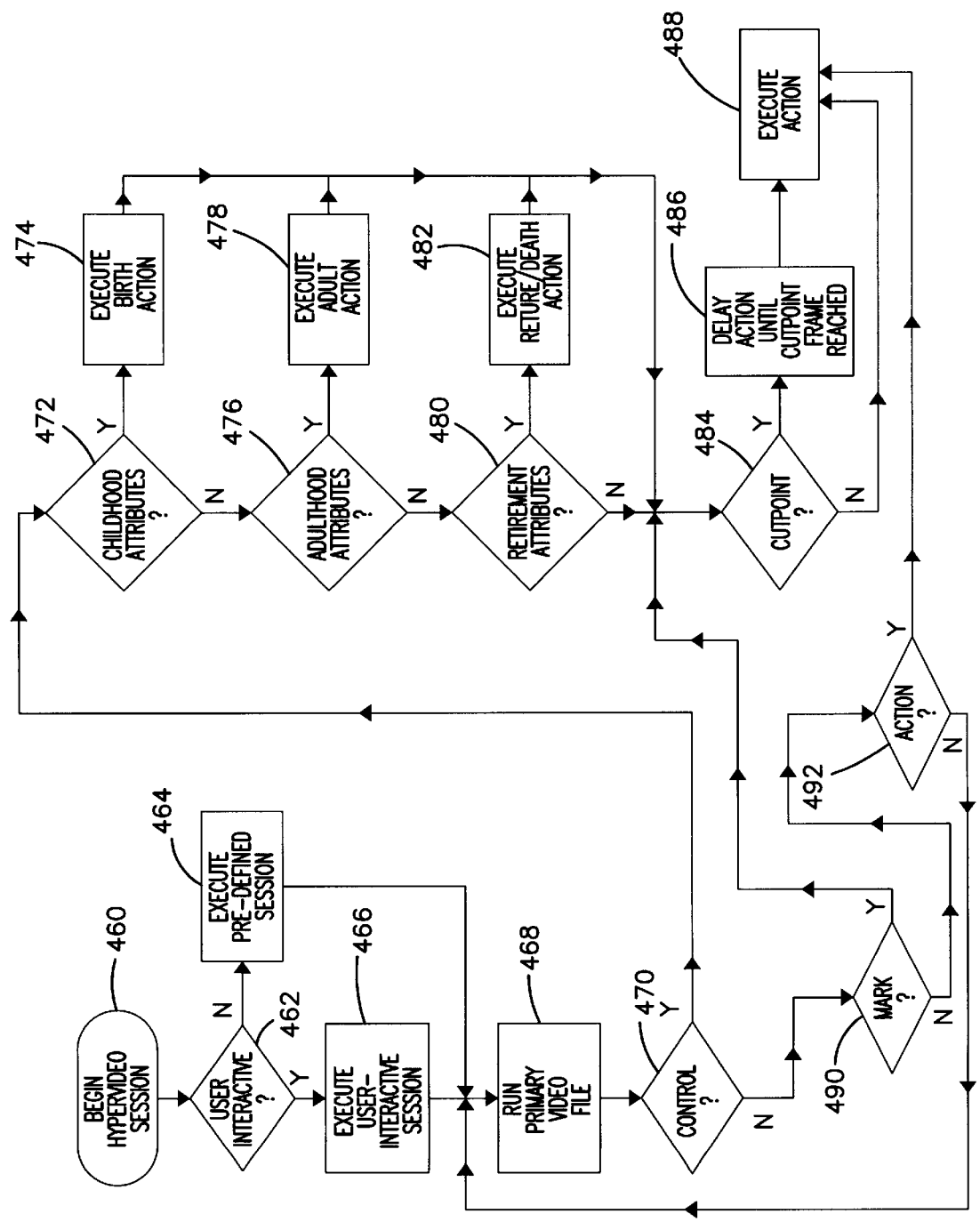

Turning now to FIGS. 10–12, there is illustrated in flow diagram form various method steps associated with executing and interacting with a hypervideo application or interface. It is assumed that a suitable multimedia presentation system, such as the one illustrated in FIG. 9, is employed. As shown in FIG. 10, a primary video file is loaded from a mass storage device 252 to RAM memory 270 at step 402. A mark video file associated with the primary video file is also loaded into the RAM memory 270 at step 404. A mark video timer 302 is established at step 406 for purposes of synchronizing mark video file data with predetermined frames of the primary video file. At step 408, the primary video file is executed and presented in the primary video window 172 of the display 318. A frame counter 301, at step 410, is incremented by one frame as each frame of the primary video file is processed for presentation in the primary video window 172. When a frame number of the primary video file corresponds to the frame-ID information defined in one or more mark files of the mark video file, the action associated with the mark is executed at step 414.

As discussed previously, an action may be associated with a control, a mark, or defined independent of a mark or control. As shown in FIG. 11, an action other than a branch transition action is executed at step 424. If a branch action is defined for the current frame, as tested at step 422, presentation of the current media file may be temporarily suspended, at step 426, if appropriate. Is some applications, presentation of the current media file continues at step 426. The location information of the branch point in the current media file is pushed onto the transition stack 303 at step 428. The new media file defined for the branch action is opened and played or presented at step 430. If the new media file also contains one or more branch actions, as tested at step 432, steps 426, 428, and 430 are repeated.

During presentation of a new media file, a return action may be initiated by a user or by an automatic return action defined in the new media file, as tested at step 434. Upon encountering a return action or mark, or receiving a user-initiated return instruction, the last branching location is popped from the transition stack 303 at step 444, and the presentation of the current (new) media file is closed at step 446. The user is returned to the previous branch location at step 448 and playing or presentation of the previous media file continues or is resumed at step 450. If, at step 434, a return action or mark is not detected or received, presentation of the currently playing or presented media file continues at step 436. If, at step 438, a stop mark is encountered or a user-initiated stop instruction is received for the purpose of leaving a hypervideo session, all currently opened media files are closed, and, where applicable, the user is returned to a parent application from which the hypervideo session was initiated, as at step 442. Otherwise, playing or presentation of the current media file continues at step 440, and the steps illustrated in FIG. 11 are repeated.

Turning now to FIG. 12, there is illustrated in flow diagram form a depiction of various method steps associated with the novel lifecycle phases of a hypervideo control. After initiating a hypervideo session at step 460, a user may select between executing a user-interactive hypervideo session or a pre-defined, non-interactive hypervideo session as indicated at steps 462, 464, and 466. If a user-interactive session is selected at step 466, the primary video file is presented at 468. Upon detection of a hypervideo control associated with a particular frame of the primary video file, as tested at step 470, the presence of lifecycle attributes defined for the control is tested at steps 472, 476, and 480. If, at the step 472, the hypervideo control has been defined to include childhood phase attributes, which is typically the case, a birth action associated with a pre-defined primary video file frame number is executed at step 474. At step 478, any adulthood actions defined for the control are executed at a predefined video frame if adulthood attributes are detected at step 476. Similarly, the existence of retirement attributes defined for a hypervideo control is tested at step 480 and, if detected, the appropriate action is executed at a predefined frame number at step 482. If, at step 484, a cutpoint has been defined for the control, the action associated with the control is delayed until a pre-defined cutpoint frame is reached, as at step 486. Upon reaching the pre-defined cutpoint frame, the action associated with the control is executed at step 488.

When, at step 490, a mark is detected during the presentation of the primary video file, the action associated with the mark is executed at 488 unless a cutpoint has been defined for the mark, as tested at step 484. The action associated with the mark is executed at step 488 only after the pre-defined cutpoint frame is reached, as indicated at step 486. Absent a defined cutpoint, any hypervideo actions detected during the presentation of the primary video file, as tested at step 492, are executed upon detection at step 488.

It is noted that hypervideo actions defined exclusive of a hypervideo control or hypervideo mark may also be delayed until a cutpoint frame is reached, as indicated at steps 484, 486, and 488.

Figure 13:
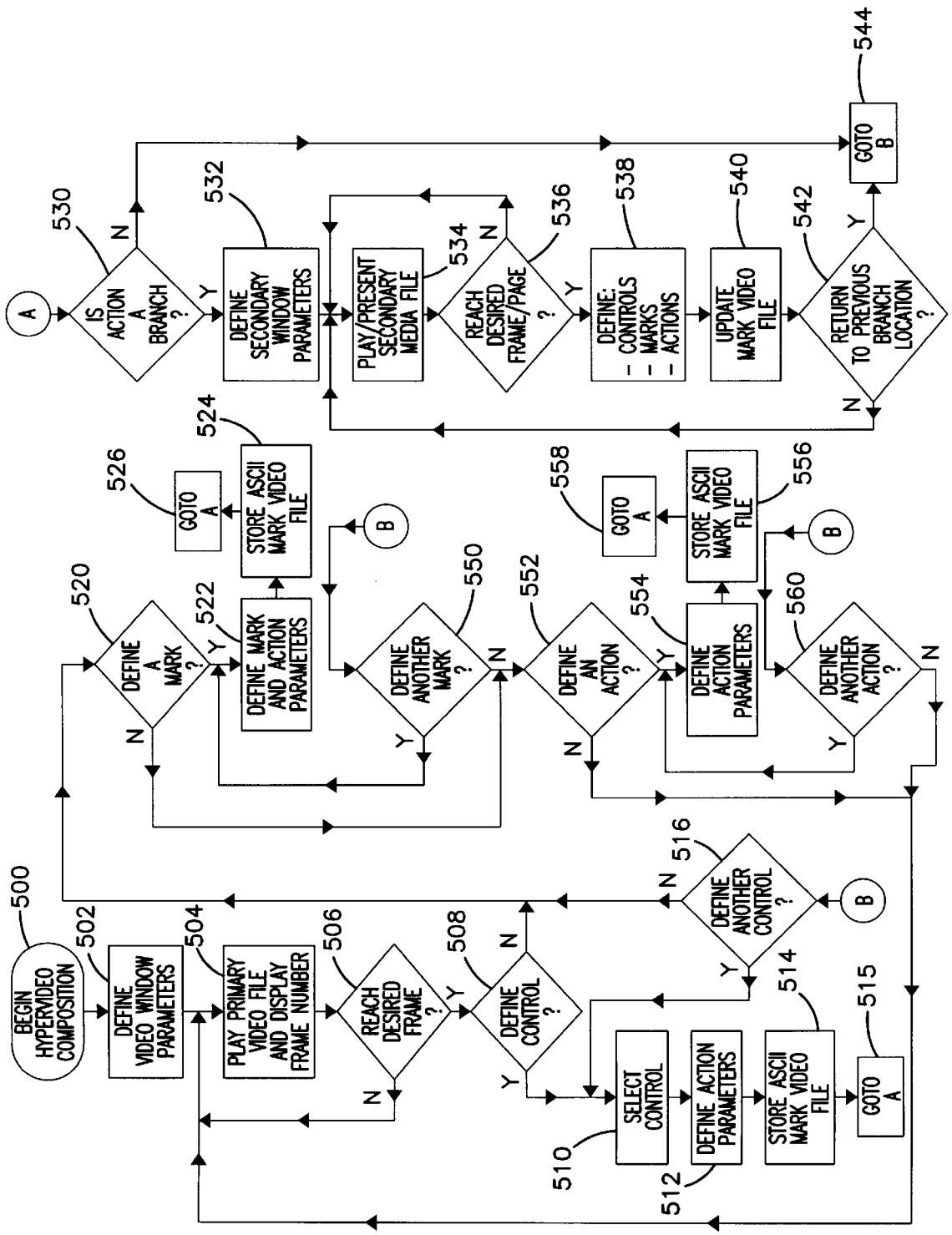
FIG. 13 is a flow diagram depicting various processing steps associated with composing a hypervideo application.

Turning now to FIG. 13, there is illustrated in flow diagram form various method steps for composing and editing a hypervideo application or interface. At step 500, a user initiates a hypervideo composition session on a suitable system, such as the one illustrated in the embodiment of FIGS. 4(a)–4(c), or, alternatively, on a system including the user interface illustrated in the embodiments of FIGS. 5–9. As discussed previously, the system shown in FIGS. 4(a)–4(c) includes a computer system 130 having a wordprocessing capability and a separate video playback system 150 which are employed to create mark video files that define hypervideo functionality associated with pre-selected frames of a digital video segment. Alternatively, the computer system 130 illustrated in FIG. 4(a) may include a hypervideo editing software application providing enhanced editing capability through the use of a hypervideo interface as previously discussed with respect to FIGS. 5–8. The process steps depicted in FIG. 13 may be accomplished by using these or other known editing apparatuses, but will be discussed generally with regard to the embodiment of a hypervideo system and interface illustrated in FIGS. 5–9.

The parameters associated with the primary video window 172, such as its location and size on the display 318, are defined at step 502. A primary video file is played at step 504, and individual frame numbers are displayed. Playing of the primary video file continues until, at step 506, a desired frame is reached. The author of a hypervideo application may define one or more hypervideo controls, actions, functions, or other behaviors at the desired frame number. For example, an author, at step 508, may decide to define a hypervideo control at the desired frame number. A desired control is selected at step 510 and parameters associated with the behavior and presentation attributes of the control, as well as the hypervideo action associated with the control, are established at step 512 and preferably stored in an ASCII mark video file at step 514.

If it is desired to define a branch transition action, as tested at step 530, the parameters of a secondary media window 180 are defined at step 532, such as the location and size of the secondary media window 180 on the interface display 318. As previously mentioned, a secondary media file may contain a video or audio clip, text, graphics, or animation information. At step 534, the secondary media file is played or presented in the secondary media window 180. When a desired frame or page is reached during the presentation of the secondary media file at step 536, an author preferably defines desired controls, marks, or other actions at the desired frame or page number at step 538. The branch action parameters are preferably added to the ASCII mark data file at step 540. An author may desire to return to the previous branch location at step 542, thus providing the opportunity to define another control at the desired frame number of the primary video file at step 516.

Upon reaching the desired frame number at step 506, a hypervideo application author may define a mark at step 520. The parameters of an action associated with the mark are defined at step 522 and preferably stored in an ASCII mark video file at step 524. If a branch transition action is desire, as tested at step 530, the steps 532–544 for defining the branch action are preferably repeated. Rather than define a control or mark at the desired frame number of the primary video file determined at step 506, a hypervideo application author may define an action at steps 552 and 554. The parameters associated with a selected action are defined at step 554 and preferably stored in an ASCII mark data file at step 556. If the selected action is a branch action, as tested at step 530, the hypervideo composition steps previously discussed with respect to steps 532–544 are preferably repeated.

After defining one or more controls, marks, or actions at the desired frame number of the primary video file as established at step 506, playing of the primary video file and displaying of subsequent frame numbers are resumed at step 504. Upon reaching another desired frame number at step 506, the process of defining hypervideo controls, marks, and actions as previously discussed may be repeated. It can be seen that a hypervideo application or interface can be rapidly composed using the system configuration illustrated in FIGS. 4(a)–4(c) or a hypervideo editor 170 as illustrated in FIGS. 5–9.

OBJECT-ORIENTED HYPERVIDEO SYSTEM IMPLEMENTATION

Turning now to FIGS. 14–26, there is illustrated a preferred embodiment for implementing a system and method for composing and playing a hypervideo application or interface. In the embodiment illustrated in FIGS. 14–26, the hypervideo composition and playback system is implemented through the use of object-oriented design principals which permits utilization of hypervideo in a broad range of applications.

Object-oriented programming is a process of developing computer software using objects, including the steps of analyzing the problem, designing the system, and constructing the program. An object is a software package that contains both data and a collection of related procedures. Since it contains both data and procedures, it can be visualized as a self-sufficient component that does not require other additional procedures or data to perform its specific task. Object-oriented programming, therefore, views a computer program as a collection of largely autonomous components, called objects, each of which is responsible for a specific task. This concept of packaging data and procedures together in one component or module is called encapsulation.

Components, in general, are reusable software modules which present an interface that conforms to an object model and which are accessed at runtime through a component integration architecture. A component integration architecture is a set of architecture mechanisms which allow software modules in different process spaces to utilize each other's capabilities or functions. This is generally done by assuming a common component object model upon which to build the architecture.

It is worthwhile to differentiate between an object and a class of objects. An object is a single instance of the class of objects, which is often just called a class. A class of objects can be viewed as a blueprint, from which many objects can be formed. In the following discussion, the term object refers to a class of objects and all possible objects that can be formed from the class.

An appropriate object-oriented programming language for developing an interactive hypervideo interface or application must, in general, fully support rudimentary object-oriented programming principles, such as encapsulation, inheritance, and composition-relationship. C++ is a suitable object-oriented programming language that offers a fast, machine-executable code, and is suitable for both commercial-application and systems-programming projects.

Other suitable object-oriented programming languages include SmallTalk, Common LISP Object System (CLOS), and EIFFEL programming languages.

A preferred implementation of an object-oriented-based hypervideo composition and playback system is preferably portable across a variety of operating system platforms. More particularly, a preferred hypervideo implementation is based on the Microsoft Foundation Class (MFC) framework. The MFC 3.0 framework standard, for example, provides support for ANSI standard C++ features. Use of the Visual C++ 2.0 compiler™ and MFC 3.0 class libraries as applied to Intel®, Macintosh®, and RISC architectures, including UNIX™, provides a high level of portability of the hypervideo engine. Compliance of the MFC 3.0 framework to the OLE (Object Linking and Embedding) specification permits "plug-in-play" hypervideo functionality to OLE compliant applications.

Figure 14:
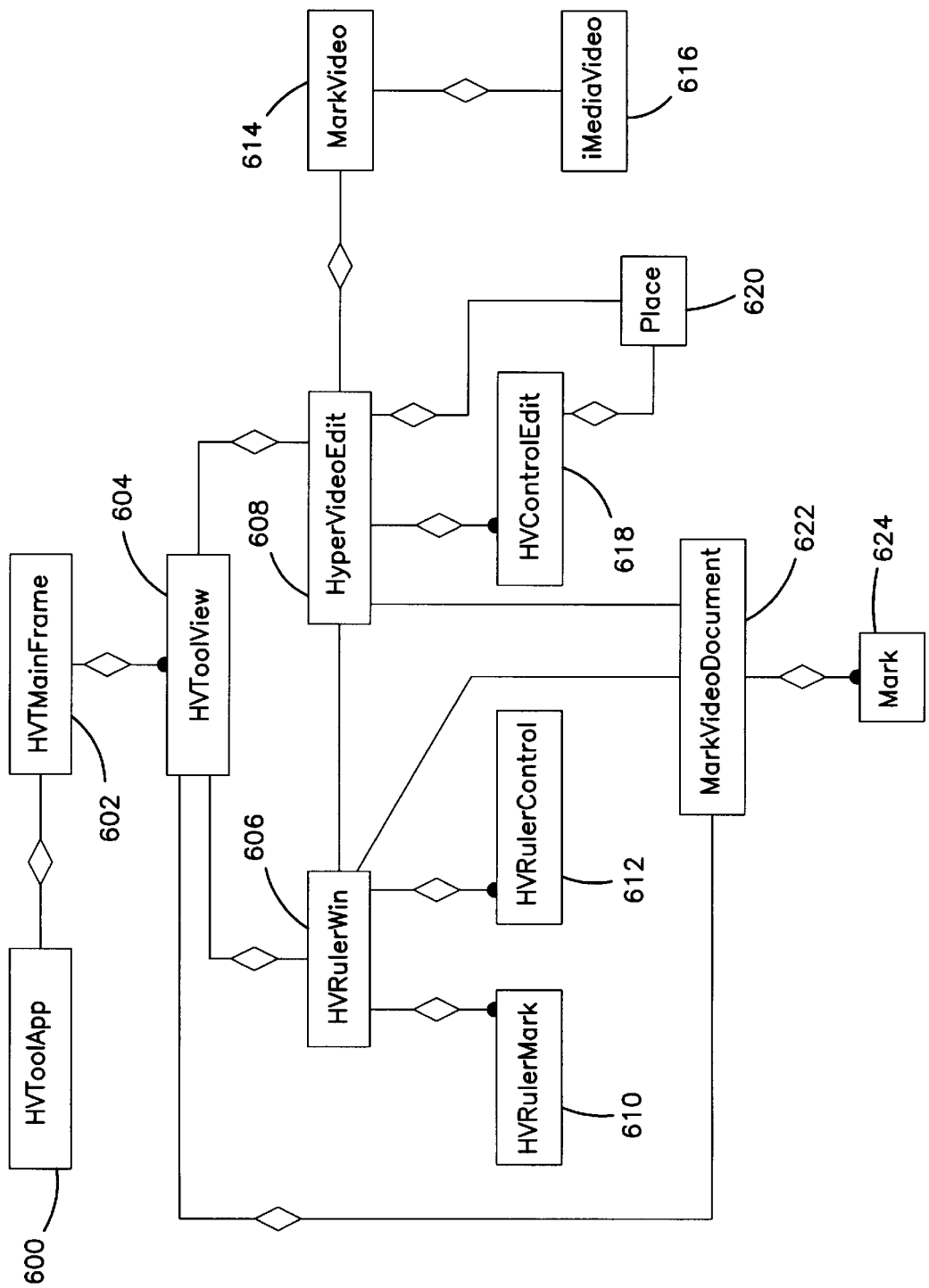
FIG. 14 is a block diagram of various software objects that cooperate with a computer to provide hypervideo application editing and playback functionality.
Figure 15:
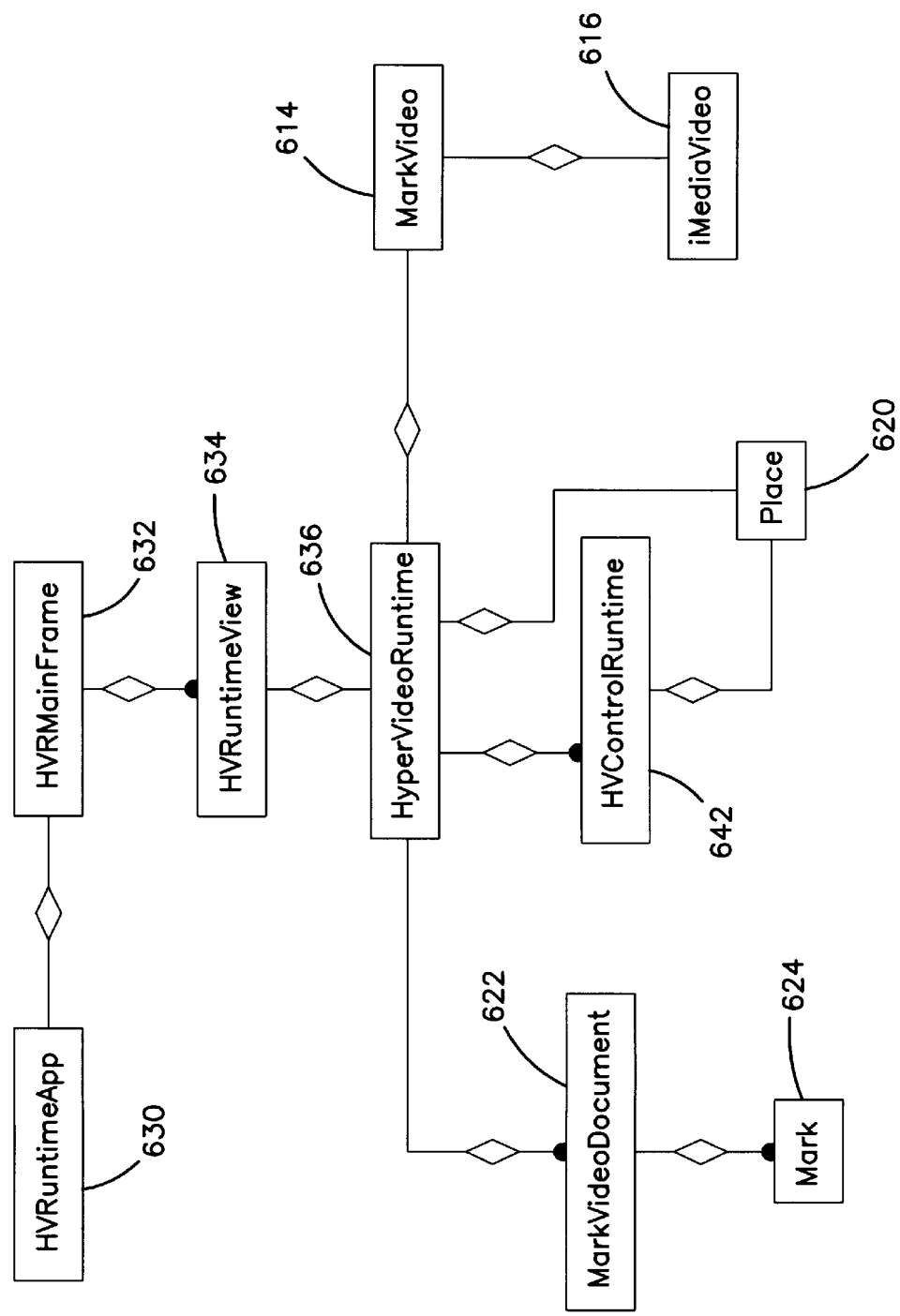
FIG. 15 is a block diagram of various software objects that cooperatively operate with a computer to provide interactive and passive playback of a hypervideo application.
Figure 16:
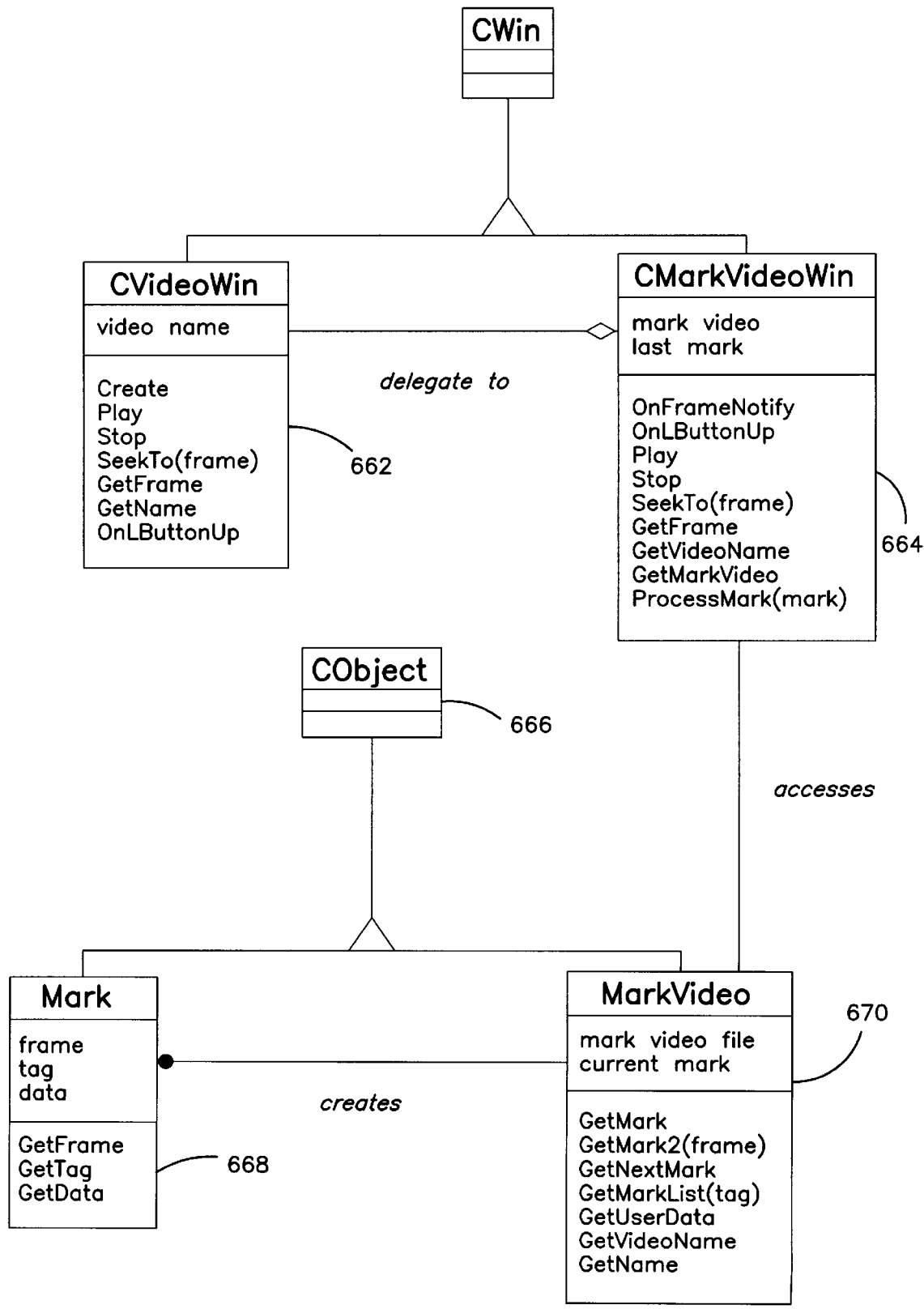
FIGS. 16–17 illustrate in block diagram form further descriptions of various hypervideo objects and their interactions within an object-oriented implementation of a hypervideo editing and playback system.
Figure 17:
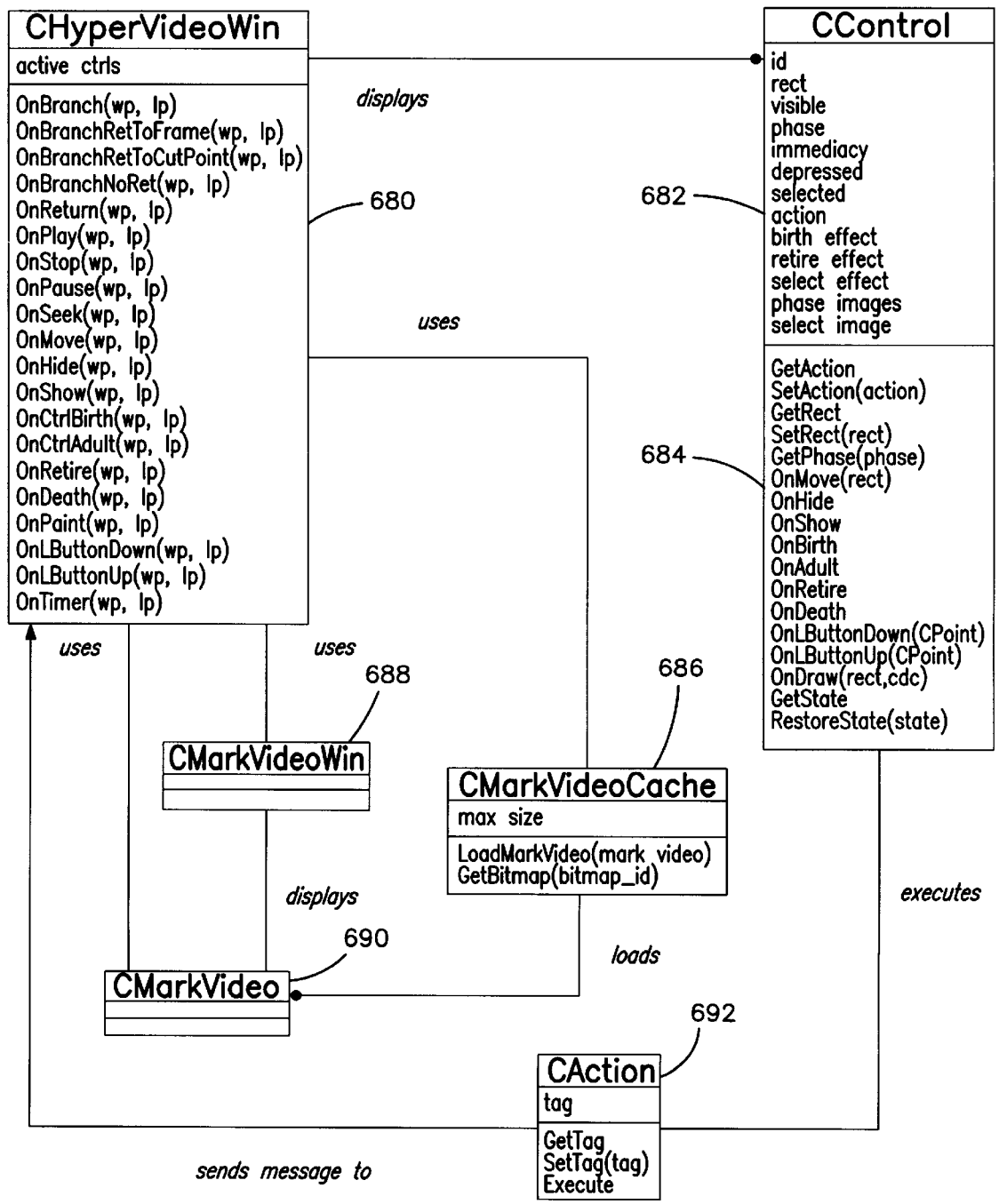

In FIG. 14, there is illustrated a block diagram of a hypervideo editor system 170 implemented using object-oriented design principals based on the MFC framework and providing an interactive hypervideo GUI interface 171 as illustrated in FIGS. 5–8. A block diagram of a hypervideo runtime system application also implemented using the MFC framework is illustrated in FIG. 15. The runtime application provides hypervideo functionality when playing back and interacting with a developed hypervideo application. The block diagrams shown in FIGS. 16 and 17 illustrate relationships between the MFC framework application class and various hypervideo-specific object classes. FIGS. 18–26 illustrate the relationship between various hypervideo object classes and the MFC object classes from which they are derived.

HyperVideo CWinApp Class Hierarchy

Figure 18:
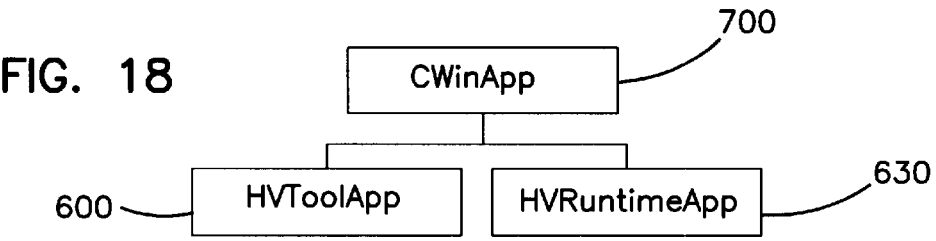
FIGS. 18–26 illustrate in block diagram form the relationship between various hypervideo object classes and the Microsoft® Foundation Class framework from which the indicated hypervideo object classes are preferably derived.

In accordance with the MFC framework, the application class provides member functions for initializing the application and for running the application. Each application that uses MFC contains one object derived from CWinApp. When the application is run, C++ global objects are constructed. Included in the global objects is the CWinApp instance allowing Windows® to call the WinMain function which is supplied by the MFC framework in CWinApp. As shown in FIG. 18, the hypervideo object-oriented implemented editor 170 derives its application from CWinApp 700 as HVToolApp 600. The hypervideo runtime application HVRuntimeApp 630 also derives its application from CWinApp 700. The application HVToolApp 600 class overrides the initialization of the CWinApp 700 application allowing the user to create and open MarkVideoDocuments 622 which contain mark video file information. The hypervideo runtime application HVRuntimeApp 630 is similarly derived from CWinApp 700 to provide initialization similar to that of the hypervideo tool application HVToolApp 600.

HyperVideo CMDIFrameWnd Class Hierarchy

Figure 19:
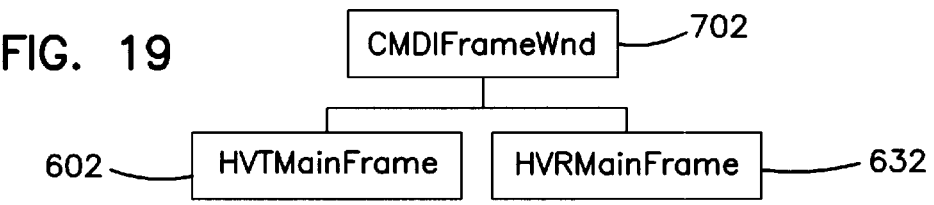

As shown in FIG. 19, the main frame of the hypervideo system application HVTMainFrame 602 is derived from the MFC framework's CMDIFrameWnd class 702. The CMDIFrameWnd class 702 provides the functionality of a Windows® Multiple Document Interface (MDI) which permits a user to have zero, one, or multiple documents open at any time. The documents can be sized and positioned within the main frame of the application. The hypervideo application HVTMainFrame 602 provides an interface from the application class to the active HVToolLView object 604, illustrated in FIG. 20, to allow responses to menu and tool bar selections.

HyperVideo CFormView Class Hierarchy

Figure 20:
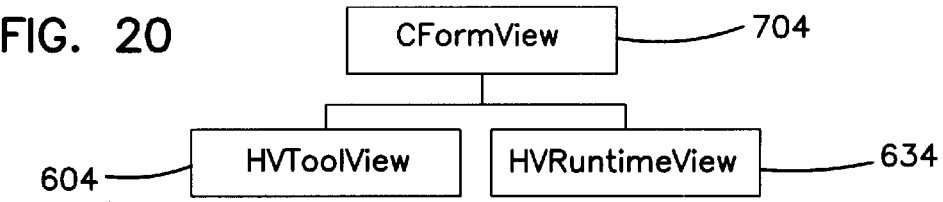

Hypervideo objects, as illustrated in FIG. 20, are preferably displayed through HVToolView 604 which acts as an intermediary between the hypervideo document and the user. HVToolView 604 effectuates an image of the hypervideo document on the video display 318 and interprets user input from the input device 320 as operations on the document. The MFC framework's CFormView class 704 allows a user to create a view using a dialogue-template resource. Through the dialogue-template resource, a new hypervideo control may be added and linked into the code to rapidly incorporate and test additional features.

Figure 21:
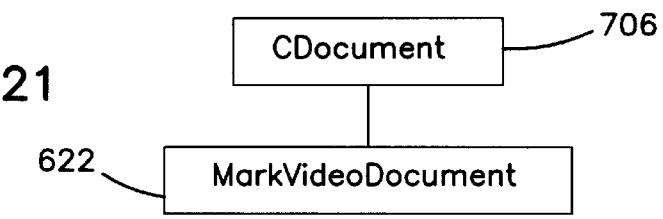
Figure 22:
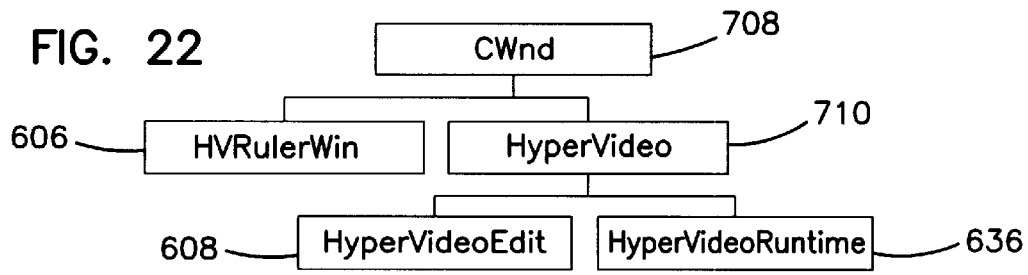

With reference to FIGS. 21 and 22, the HVToolView object 604 preferably displays two views on the MarkVideoDocument object 622. One window provides a space-based view which most nearly represents what the hypervideo application will look like to the user at runtime. The HyperVideoEdit window 608 contains a video object, such as the MarkVideo object 614 as shown in FIGS. 14 and 15, as well as all controls which appear and disappear in accordance with the lifecycle phases and events of the novel hypervideo controls. The second window, HVRulerWin 606, provides a time-based view of the MarkVideoDocument object 622. The HVRulerWin object 606 displays a ruler-like view at hypervideo marks within the MarkVideoDocument object 622. A user may click within the ruler region 182 to progress the presentation of a video file to a particular frame, and may also reposition marks within this ruler region 182 by "clicking-and-dragging" the mark to a new location. Communication between the two windows is provided to allow the ruler 182 to display the lifecycle phases of hypervideo controls. The hypervideo runtime application HVRuntimeApp 630 is also preferably derived from the CFormView class 704, and creates a similar class, HVRuntimeView 634, to link the application and mainframe classes to the HyperVideoRuntime class 636.

HyperVideo CDocument Class Hierarchy

The MarkVideoDocument class 622 is subclassed from the MFC framework's CDocumentClass 706 as shown in FIG. 21. This allows the MFC framework to open, close, save (serialize), create, and destroy instances of this class. A MarkVideoDocument object 622 reads in the contents of a mark video file and loads all marks into memory when opened. All marks are stored in a list and are accessible through the hypervideo API. This document preferably contains a header block containing a no-termination string representing the name of the associated video file (e.g., *.AVI) and a short integer representing the number of unique mark types contained in the mark video file. Following the header section of the MarkVideoDocoument is a body of marks. These marks are preferably stored in increasing order by frame number. Hypervideo marks defined for duplicate frame numbers are stored in random order. An interface is provided in the MarkVideoDocument class 622 allowing access to marks by type or position, access to header information, and the ability to add, delete and update marks.

HyperVideo CWnd Class Hierarchy

As illustrated in FIG. 22, the MFC framework's CWnd class 708 provides the base functionality of all window classes in the MFC framework library. Incoming Windows® notification messages are automatically routed through the message map to the proper OnMessage CWnd member functions. When deriving objects from the CWnd class 708, a developer may simply override the correct OnMessage member function through the ClassWizard to handle desired Windows® messages. In developing hypervideo applications, many classes may be derived from the CWnd class 708 to provide base Windows® functionality which also allows mouse action notifications.

HyperVideo Class

The HyperVideo class 710 is preferably derived from the CWnd class 708. The CWnd object allows for painting, creation, destruction, and handling of button events. The HyperVideo base class 710 overrides these functions from CWnd 708 to include class specific functionality in each of these areas. The derivation provides a space-based view of the MarkVideoDocument object 622 to show the actual video as it plays, as well as a view of controls (HVControls 714) as they are born and die.

The HyperVideo object 710 provides "hyper" functionality by using a MarkVideo object 614 and one or more MarkvideoDocuments 622. The HyperVideo class 710 performs basic operations such as creating and maintaining the MarkVideo object 614, loading the control objects from the MarkVideoDocument 622, unloading controls from memory, setting up Mark 624 notifications with the MarkVideo object 614, and providing a basic VCR-like interface to the MarkVideo object 614. The HyperVideo class 710 is notified of each Mark 624 as it occurs and responds accordingly. HyperVideo 710 preferably responds to each Mark notification with a default action as described below in Table 7:

TABLE 7

MARK_CUT:
    If a control is active, unhighlight the
    control and turn off cut notification.
MARK_EOV:
    Do nothing by default.
MARK_MOVE_VIDEO:
    Move the video to the location specified.
    This does not change the video state
    (Playing/Paused/Stopped) or the video
    visibility (Hidden/Shown).
MARK_HIDE_VIDEO:
    Hides the video object. This does not
    change the video state
    (Playing/Paused/Stopped).
MARK_SHOW_VIDEO:
    Shows the video object. This does not
    change the video state
    (Playing/Paused/Stopped).
MARK_CTRL_BIRTH:
    Looks up the control object in the
    current files control list and sets its
    state to BORN.
MARK_CTRL_ADULT:
    Looks up the control object in the
    current files control list and sets its
    state to ADULT.
MARK_CTRL_RETIRE:
    Looks up the control object in the
    current files control list and sets its
    state to RETIRE.
MARK_CTRL_DEATH:
    Looks up the control object in the
    current files control list and sets its
    state to DEAD.

A hypervideo application developer may subclass the HyperVideo class 710 to add additional functionality in response to user-defined Marks or user-defined control functions.

HyperVideoEdit Class

Still referring to FIG. 22, the HyperVideoEdit class 608 is derived from the HyperVideo class 710. The HyperVideoEdit class 608 allows editing of the Marks 624 stored in the MarkVideoDocument 622. In addition to normal hypervideo functions, HyperVideoEdit 608 provides functions to size the video box, add Marks of each type, edit existing Marks and control attributes, and simulate the runtime action of selecting a control.

HyperVideoEdit 608 preferably overrides the button event functionality. Left Mouse clicks, for example, activate the video region and controls for repositioning and re-sizing. Double clicks, by way of further example, activate a control and pop up a dialogue for editing control attributes. Right mouse clicks preferably test activation of the control. HyperVideoEdit 608 overrides Mark 624 notification for some Marks as described below in Table 8:

TABLE 8

MARK_CUT:
    Perform HyperVideo functionality first,
    then if a control is active, Stop the
    video.
MARK_EOV:
    Seek to frame 0 of the video.
MARK_CTRL_DEATH:
    Perform HyperVideo functionality first,
    then if a control is active, Perform that
    controls action (Call the MARK_CUT
    callback)

HVRulerWin Class

The HVRulerWin class 606 overrides OnMessage methods for the painting, creation, destruction, and handling of button control events. Each tick on the ruler 182 represents a synchronization between the iMediaVideo object 616 and the MarkVideoDocument object 622 by drawing symbols of all Marks 624 and the active HVControl present at that time. Information is presented on the display interface 171 by analyzing the MarkVideoDocument 622, as well as receiving current state information from the HyperVideoEdit 608 instance.

The HVToolView object 604 uses the HVRulerWin class 606 as a way to graphically present frame locations of any number of Mark types in a time-based format. A user may change the frame at which a Mark instance occurs simply by clicking and dragging the Mark to the new frame tick. Each Mark can also be deleted by dragging the Mark off the ruler area. A preferred graphical representation of four Mark types is provided below in Table 9.

TABLE 9

MARK_CUT:
    A gray 3D triangle.
MARK_MOVE_VIDEO:
    A blue 3D triangle.
MARK_HIDE_VIDEO:
    A red 3D triangle.
MARK_SHOW_VIDEO:
    A green 3D triangle.

Four other Marks specify the lifecycle of an active HVControl. By selecting and moving the control transitions to a new location in the ruler 182, the control lifecycle is automatically adjusted. In one embodiment, the time-based view of the control is drawn as light blue, dark gray, and red boxes in the top of the ruler box 182. Each control lifecycle transition is drawn at the transition frame preferably by a 3-pixel width line. Adjusting a transition changes the following Marks in the MarkVideoDocument 622 as indicated below in Table 10:

TABLE 10

MARK_CTRL_BIRTH:
    The first Mark in the lifecycle drawn at
    the most left side of the light blue box.

TABLE 10-continued

MARK_CTRL_ADULT:
    The control transition between birth and adulthood is drawn in between the light blue and dark gray boxes.
MARK_CTRL_RETIRE:
    The transition between the adulthood and retirement age stage of the control is drawn between the dark gray and red boxes.
MARK_CTRL_DEATH:
    The death Mark is the last Mark in the lifecycle and is drawn at far right of the red box.

HyperVideo CStatic Class Hierarchy

Figure 23:
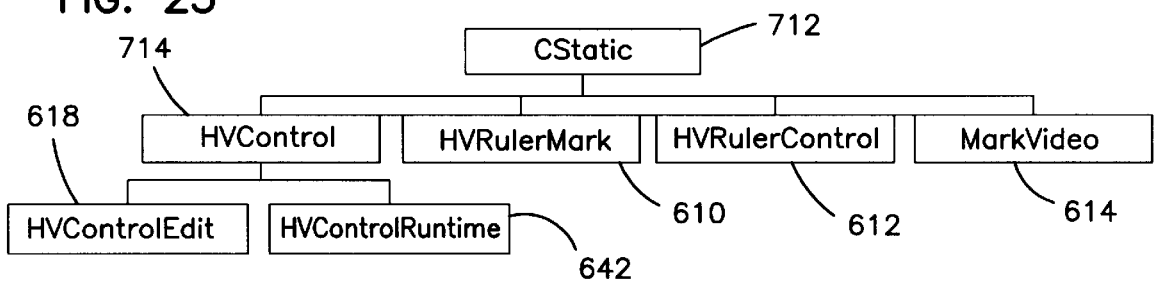

As illustrated in FIG. 23, several objects in a HyperVideo application are preferably derived from the MFC framework's CStatic class 712. The CStatic class 712 provides the functionality of a Windows® static control. A static control may be a simple text field, box, or rectangle, for example. Further, a static control receives no input and provides no output.

HVControl Object

The HVControl objects 714 need to display themselves but do not need to interpret mouse activity or keyboard input. As such, the CStatic class 714 provides the appropriate level of functionality. The CStatic-derived Hypervideo objects can be created as a child window of the HyperVideo object 710 and will automatically paint themselves when invalidated. HyperVideo 710 handles all mouse and keyboard input required to create, move, activate, and destroy control objects.

HVControl 714 is the base class derived from CStatic 712. At this level, functions are overridden from CStatic 712 to provide initialization in the OnCreate function and draw functionality in OnPaint. In addition, various functions provide access to all control information, modify control state, and load images from resource files and external bitmap files.

HVControlEdit Object

The HVControlEdit object 618 is derived from HVControl 714. HVControlEdit 618 adds overrides of OnSize and OnMove to update, for example, a control's birth Mark with the new coordinates. Modifier functions allow the developer to change attributes of the control. Other functions allow the developer to add, delete, and update control Marks within a hypervideo document.

HVControRuntime Object

The HVControlRuntime object 642 preferably modifies any drawing functions required for a hypervideo runtime application. The HVControlRuntime base class 642 preferably has default appearances for controls in each state with a given display type. If an application is designed to change this appearance or use the effects stored within the control, it preferably overrides the virtual functions DrawBitmap, DrawText, DrawInvisible, and DrawDefault. To add effect drawing, the developer may override the OnPaint function in order to add the desired effect after the drawing takes place.

In accordance with a preferred embodiment, hypervideo control information is stored in four types of Marks, namely, a Birth Mark, an Adult Mark, a Retire Mark, and a Death Mark, as discussed previously hereinabove. The data formats for each mark type are provided above in Tables 2 and 4.

MarkVideo Object

Figure 26:
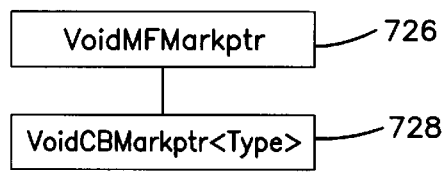

A HyperVideo object 710 includes a MarkVideo object 614 so that it can be informed when a predetermined frame in the video has been reached which has been tagged with a Mark. The MarkVideo object 614 uses an iMediaVideo object 616 for video playback and sets up callbacks which iMediaVideo 616 calls into MarkVideo 614 on every frame and end of video. When a frame notification is received, MarkVideo 614 looks in the MarkVideoDocument 622 for Marks 624 from the previous notification to the current frame and initiates a VoidMFMarkptr callback 726, as shown in FIG. 26, based on the type of Mark 624. An interface to the MarkVideo object 614 permits the HyperVideo object 710 to set Mark 624 callbacks, specify a callback for mouse events which occur in the iMediaVideo object 616, as well as control the video playback through the iMediaVideo 616 API.

HVRulerMark Object

The HVRulerMark object 610 is the visual representation of a Mark 624 on the ruler 182 preferably displayed as a three-dimensional triangle. HVRulerMarks 610 are derived from the CStatic class 712 for maintenance of their location on the ruler 182 depending on mouse selections and tracker movements. Each HVRulerMark 610 also stores a pointer to the Mark 624 it represents so that the frame location at which the Mark 624 exists can be easily updated.

HVRulerControl Object

The HVRulerControl object 612 is the visual representation of a HVControl 714 transition displayed as a black solid line. An HVRulerControl 612 is placed at the birth, adult, retirement, and death frames of an HVControl 714 if they are in the HVRulerWin's current display area. As with the HVRulerMark object 610, HVRulerControls 612 store a pointer to the HVControl 714 they represent. Changes in the HVRulerControl 612 transitions are translated to their HVControl 714.

HyperVideo CObject Class Hierarchy

Figure 24:
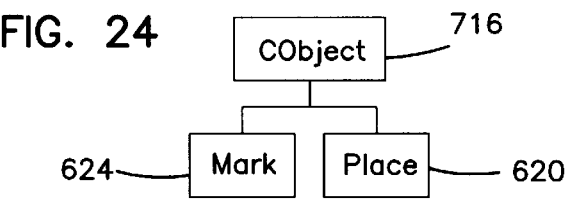

As illustrated in FIG. 24, CObject 716 is the primary base class for objects which use MFC framework techniques. Specifically, CObject 716 provides serialization support, runtime class information, object diagnostic output, and collection class compatibility.

Mark Object

A Mark object 624 reports information about events which should occur during playback of a video file. CObject 716 serialization routines provide Marks 624 the ability to read and write their own instance data under the control of the application document. Most classes interact by passing Mark 624 instances to manipulate the document or hypervideo application.

Preferably, eight action types are represented by Marks 624, including control transitions, such as move, hide, and show video, cutpoints, and start or end video occurrences. Additional action types may be defined by the user as offsets from the MARK_USER_DEFINED mark type.

Place Object

As discussed previously hereinabove, places are the destinations of actions which occur by activating a control in the runtime application. By subclassing from CObject 716, Places 620 retain the ability to read and write their instance data. The HyperVideo Tool allows three types of destinations to be associated with a control, including a video transition, a page transition, and a return. Video transitions allow a hypervideo application developer to force the HyperVideoRuntime object 636 to switch the currently active MarkVideo 614. On a page transition, the application may present a new look and feel to the end user or even activate a non-hypervideo style conversation. The HyperVideoRuntime class 636 maintains a stack 303 of Places which have been traversed by an application user. A return Place specifies that the runtime application should pop the top of the stack 303 and return the application to its previous Place.

HyperVideo CRectTracker Class Hierarchy

Figure 25:
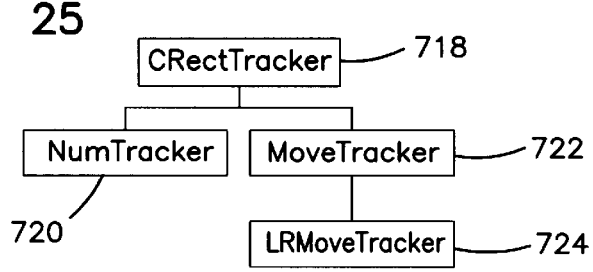

In general, the HyperVideo Tool can be thought of as an application which can edit the HVControlEdit 618 and Marks 624 associated with a video or media file. The CRectTracker class 718, shown in FIG. 25, gives this MFC, framework-derived application the ability to move, re-size, and display in-place items by drawing dotted and solid line borders with up to eight re-size handles connected to the implicated item.

By subclassing from the CRectTracker class 718, the HyperVideo Tool uses three types of trackers to help manage the graphical editing of the HVControls 714 and Marks 624. The NumTracker class 720 allows the developer to perform re-size and move editing on HVControl objects 714, HyperVideo objects 710, and MarkVideo objects 614 in the spaced-based view provided by the HyperVideo object 710. Since extent data is generally important to the aesthetics of the final runtime application, the NumTracker 720 displays the x/y and width/height parameters in the status bar 173 at the bottom of the hypervideo application.

Two trackers allow the HVRulerWin object 606 to change time-based data associated with Marks 624 and HVControls 714. A MoveTracker class 722 provides the ability to move Marks, but prohibits the user from re-sizing the triangle tick marks which represent Marks within the ruler region 181. A subclass of MoveTracker 722, LRMoveTracker 724, gives the HVRulerWin object 606 the ability to provide the user with adjustment control of HVControl 714 transitions simply by moving the transition to the left or right within the ruler 182. All three classes 720, 722, and 724 perform their complex functionality simply by overriding one method in the CRectTracker class 718, thereby significantly decreasing development time.

HyperVideo Callback Class Hierarchy

HyperVideo makes extensive use of callbacks to make or receive function calls that are dynamic rather than statically linked class methods. A "callback" is a class which stores both a class instance and a method function pointer which is initiated on a call to the base class virtual call method using the signature designed into the callback. For example, MarkVideo 614 receives frame, end of video, and mouse notifications from the iMediaVideo class 616 by passing a VoidMFLong(void func(long) signature) callback, a VoidMFVoid(void funco) callback, and a VoidMFShortLong (void func(short,long)) callback for each notification type, respectively.

HyperVideo classes utilize callbacks for communication between the MarkVideo 614 and its parent class. The parent class creates a VoidMFMarkptr(void func(Mark*)) callback for each of the mark types it expects to handle. The callback is then registered in the MarkVideo class 614. Upon receiving a frame notification, the MarkVideo class 614 invokes the registered callback for each Mark 624 associated with the video frame. This allows developers to subclass the parent class and handle each mark type differently without the MarkVideo class 614 needing to be relinked to the new class name.

HyperVideoRuntime Object

As shown in FIG. 22, the HyperVideoRuntime class 636 is derived from the HyperVideo class 710 which, in turn, is derived from the MFC framework's CWnd object 708. HyperVideoRuntime 636 preferably overrides notification for any Marks 624 which require runtime specific functionality. If a hypervideo runtime application is to use any control types other than those provided by the base HVControl object 714, HyperVideoRuntime 636 preferably overrides the CreateControl function to instantiate an object of a different type. This method can also be modified to prevent automatically loading all images upon creation of controls to preserve memory until the object is actually displayed. HyperVideoRuntime 636 preferably overrides Mark 624 notification for some Marks as described below in Table 11:

TABLE 11

MARK_USER_DEFINED:
    If the user defines their own types of Marks, MarkVideo will pass all notifications to one function. The user may parse them by the mark_type as an offset from MARK_USER_DEFINED.
MARK_EOV:
    GoToEOV Place stored in the mark file's control header.
MARK_CTRL_DEATH:
    Perform HyperVideo functionality first, then if a control is active, perform that control's action (Call the MARK_CUT callback). This is required if it is desired that the control should automatically activate upon control death. Otherwise, the control will simply deactivate upon death.

HyperVideo Class Description

In Table 12 below, there is provided a listing and description of the HyperVideo objects that provide hypervideo functionality as described hereinabove by using a MarkVideo object 614 and one or more mark video files from MarkvideoDocument 622. The MarkVideo object 614 provides VCR-like functionality and interleaves marks with each video or media file. HyperVideo objects create and destroy controls and respond to activation of those controls, such as by effecting branch transitions between video files and between application pages. For purposes of illustration, and not of limitation, the more important HyperVideo objects are identified in Table 12 as follows:

TABLE 12

| Public Interface: | |
|---|---|
| HyperVideo() | Standard constructor, initialize data |
| Open(ContentTag markfile) | Open MarkFile, preload controls, Setup Mark Notification |
| Play() | Play current video |
| Pause() | Pause current video |
| Stop() | Stop current video |
| Close() | CloseMarkFile, cleanup from Open call |
| ~HyperVideo() | Destructor |
| Protected Functions: | |
| PreloadCtrls(ContentTag, CrtlHeader*) | Recursively load controls |
| UnloadCtrls() | Unload controls from memory |
| Find CtrlHead(ContentTag markfile) | Locate markfile controls list |
| virtual SetMarkNotification() | Establish association between marks and callback functions |
| virtual CreateControl (Mark*mark_line) | Create control object using mark line. This function can optionally load associated images |
| Goto (Place*next_place) | Branch to next video_frame or page represented in next_place. If next_place is a GoBack place, pop from the stack to return to previous place. |

TABLE 12-continued

| | |
|---|---|
| Branch(ContentTag video, int frame) | Branch to frame within video file |
| Branch(char*page_tag) | Branch to page |
| Place *MakePlace() | Create a place representing current markfile an cut point |
| SetDisplayState(int frame_num) | Display all controls (in correct state) for a given frame number. Position the video correctly for the given frame number. |
| virtual OnCtrlBirth (Mark*mark_line) | Display control with birth effect |
| virtual OnCtrlAdult (Mark*mark_line) | Remove birth effect from control |
| virtual OnCtrlRetire (Mark*mark_line) | Add Age effect to control |
| virtual OnCtrlDeath (Mark*mark_line) | Remove control (and age effect from display |
| virtual OnEndOfVideo (Mark*mark_line) | Perform end of video function |
| virtual OnMoveVideo (mark*mark_line) | Perform move video function |
| OnButtonUp () | Activate correct control (if control selected) |
| Control *DetermineControl (int x, int y) | Determine control containing point |
| SetActiveControl (Control *active_ctrl) | Prepare control for activation at next cut point |
| ActivateControl(Mark*) | Perform control action for active control |
| FindControlWithMark (Mark*mark) | Locate control in current control list that contains the given mark |
| Instance Data: | |
| MarkedVideo mark_video_player | Marked Video instance |
| CtrlHeader *ctrl_list | LinkedList of all controls from all mark files |
| ContentTag cur_markfile | Active markfile |
| CtrlHeader *cur_ctrls | Current Control Header |
| Stack<Place> returnStack | Return stack |
| Control *active_control | Holds selected control until next cut point |

HyperVideo Function Definition

Described below in Tables 13–50 are code-level functional descriptions of each of the Hypervideo objects listed above in Table 12. A brief description of each function and associated pseudo-code is provided. It is to be understood that the following functional and code-level descriptions are provided for purposes of illustration, and do not constitute a limitation on the implementation for effecting hypervideo functionality.

TABLE 13

HyperVideo::HyperVideo()
Details:    Default Constructor. Initializes data members.

TABLE 14

HyperVideo::Open(ContentTag markfile)
    markfile  Content tag representing markfile. This tag will be resolved into a file path using Execution Architecture's data services.
Description:   Preload controls, Open Markfile and associated MarkVideo, Associate Marks with Callback functions.
Pseudo-Code:
    HyperVideo::Open(ContentTag markfile)
    {

TABLE 14-continued 1. ctrl_list=PreloadCtrls(markfile,0);
2. mark_video_player.Open(markfile,1);
3. mark_video_player.ClearNotification();
4. SetMarkNotification();
    //Set cur_ctrls by locating the file header in
    //the control list.
5. cur-ctrls=FindCtrlHead(markfile);
}

TABLE 15

HyperVideo::Play()
Description:    Play current MarkVideo
Pseudo-Code:
    HyperVideo::Play()
    {
    1.    mark-video-player.Play();
    }

TABLE 16

HyperVideo::Pause()
Description:    Pause current MarkVideo
Pseudo-Code:
    HyperVideo::Pause()
    {
    1.    mark_video_player.Pause();
    }

TABLE 17

HyperVideo::Stop()
Description:    Stop current MarkVideo
Pseudo-Code:
    HyperVideo::Stop()
    {
    1.    mark-video-player.Stop();
    }

TABLE 18

HyperVideo::Close()
Description:    Close the current MarkVideo, Unload controls, Clear Mark Notifications
Pseudo-Code:
    HyperVideo::Close()
    {
    1.    mark_video_player.Close();
    2.    UnloadControls();
    3.    mark-video-player.ClearNotification();
    }

TABLE 19

HyperVideo::~HyperVideo()
Description:    Destroy the hyper video object

TABLE 20

CtrlHeader *HyperVideo::PreloadCtrls(ContentTag markfile, CtrlHeader *cth)
    markfile  Content tag representing markfile. This tag will be resolved into a file path using Execution Architecture's data services.

TABLE 20-continued

| | | |
|---|---|---|
| | cth | Control header pointer representing previous Control Array Header |
| Description: | | Recursively load all controls into a data structure. this function loads all content and prepares to display controls when needed. |

Returns: Pointer to first control header
Pseudo-Code:

```
HyperVideo::PreloadCtrls(ContentTag markfile,
CtrlHeader *cth)
{
1.   MarkVideo tmpVideo;
2.   tmpVideo.Open(markfile,0);
3.   CtrlHeader *newHeader =
     malloc(sizeof(CtrlHeader));
4.   newHeader->fileTag=markfile;
5.   newHeader->next=0;
     //Determine end of video place
6.   Mark place_mark
7.   place_mark,mark_type=MARK_EOV;
8.   tmpVideo.getNextMark(&place_mark,0);
9.   newHeader->eovPlace=new Place(&place_mark);
10.  int array_size=tmp
     Video.MarkCount(MARK_CTRL_BIRTH);
11.  newHeader->array_size = array_size;
12.  newHeader->CtrlTable=calloc(array_size,
     sizeof(Control *));
13.  int mark_index=0;
14.  while(mark_index=0)
     {
     15.   Mark *nextMark = newMark;
     16.   nextMark->mark_type=MARK_CTRL_BIRTH;
           //get NextMark fills in the mark object
           //passed and returns the index
           // representing that mark. This index
           //assists in locating multiple
           //identical marks at a single frame
           //number.
     17.   mark_index=tmp
           Video.getNextMark(nextMark, mark_index);
     18.   Control
           *nextCtrl=CreateControl(nextMark);
     19.   newHeader->CtrlTable[nextCtrl->ctrl_id]
           =nextCtrl;
     }
20.  if(!cth)
21.    return newHeader;
22.  else
     }
23.    cth.next=newHeader;
24.    return cth;
     }
}
```

TABLE 21

```
HyperVideo::UnloadCtrls()
Description:   Unload all controls from memory.
               this function should destroy images
               if loaded.
Pseudo-Code:
     HyperVideo::UnloadCtrls()
     {
     1.   CtrlHeader*ctrl_head = CtrlList;
     2.   while(ctrl_head)
          {
          //Loop through ctrl-head. CtrlTable and
          //delete all Controls stored in the
          //table.
          3.   int array_size = ctrl_head->array_size;
          4.   Control**ctrl_array = ctrl_head-
               >CtrlTable;
          5.   for (int i = 0; i < array_size; i++)
               {
               6.   Control*ctrl = ctrl_array[i];
               7.   delete ctrl;
```

TABLE 21-continued

```
          }
          //free Ctrl Table
     8.   free CtrlTable;
     9.   ctrl_head->CtrlTable = 0;
     10.  CtrlHeader*tmp = ctrl_head;
     11.  ctrl_head=ctrl_head->next;
     12.  delete tmp;
          }
     }
```

TABLE 22

| | |
|---|---|
| CtrlHeader *HyperVideo::FindCtrlHead(ContentTag markfile) | |
| markfile | Content tag representing markfile. This tag will be resolved into a file path using Execution Architecture's data services. |
| Description: | Find and return control header for markfile from control list |
| Returns: | CtrlHeader for given markfile if found, 0 if not found. |

Pseudo-Code:

```
HyperVideo::FindCtrlHead(ContentTag markfile)
{
1.   CtrlHeader*header = CtrlList;
2.   while (header)
     {
     3.   if (!strcmp(header->fileTag.markfile))
     4.        return header;
     5.   else
     6.        header = header->next;
     }
7.   return 0;
}
```

TABLE 23

HyperVideo::SetMarkNotification()
Description:   Associate marks with function callbacks
Pseudo-Code:

```
HyperVideo::SetMarkNotification()
{
     //Call "mark_video-Player.Set Notification"
     //with each MARK_TYPE and function address to
     //callback.
}
```

TABLE 24

| | |
|---|---|
| Control*HyperVideo::CreateControl(Mark*mark_line) | |
| mark_line | Mark representing a line in a markfile. This contains frame number, mark type, raw data size and raw data bytes. |
| Description: | Create and return a new control using the mark_line |
| Returns: | New control, 0 if mark_line not a MARK_CTRL-BIRTH mark. |

Pseudo-Code:

```
HyperVideo::CreateControl(mark*mark_line)
{
1.   if (mark_line->mark_type!=MARK_CTRL_BIRTH)
2.        return 0;
     //Use control constructor passing mark_line
3.   Control *newCtrl = new Control(mark_line);
     //Load image from control
4.   newCtrl->LoadImage ();
}
```

TABLE 25

```
HyperVideo::GoTo(Place *next_place)
    next_place    Place representing destination to
                  branch to. Place can be one of 3
                  types: GoBack, Video, Page.
Description:      Resolve the place types and either branch
                  to the place passed or pop the top place
                  from the stack and return to previous
                  place.
Pseudo-Code:
    HyperVideo::GoTo(Place *next_place)
    {
    1.    if(next_place->isA(VIDEO_PLACE))
          {
                //Push current place onto stack to allow
                //return
    2.          returnStack.push(MakePlace ());
    3.          ContentTag markfile = next_place-
                    >MarkFile ();
    4.          int frame_num = next_place->Frame ();
    5.          Branch (markfile, frame_num);
          }
    6.    else if (next_place->isA(PAGE_PLACE))
          {
                //Push current place onto stack to allow
                //return
    7.          returnStack.push(MakePlace ());
    8.          char *page = next_place->Page ();
    9.          Branch (page);
          }
    10.   else //next_place->isA(GOBACK_PLACE)
          {
    11.         if (returnStack.isEmpty ())
                {
                    //Branch to page 0 to indicate "game
                    //over"
    12.             Branch (0);
                }
    13.         else
                {
                    //Pop the top place from the stack
                    //and goto that place.
    14.             Place *topPlace = returnStack.pop();
    15.             ContentTag markfile = next_place-
                        >MarkFile();
    16.             int frame_num = next_place->Frame();
    17.             Branch(markfile,frame_num);
    18.             *delete topPlace;
                }
          }
    }
```

TABLE 26

```
HyperVideo::Branch(ContentTag video, int frame)
    video      Content tag representing markfile to
               branch to. This tag will be resolved
               into a file path using Execution
               Architecture's data services.
    frame      Frame number to play in markfile's video.
Description:   Switch to video file and start playing at
               indicated frame.
Pseudo-Code:
    HyperVideo::Branch(ContentTag video, int frame)
    {
        //If this is a new markfile, close other
        //video, open this file
    1.    if (strcmp (video, cur_markfile))
          {
    2.        mark_video_player.Close();
    3.        mark_video_player.Open (video,1);
    4.        cur_markfile=mark_video;
                //Set cur_ctrls by locating the file
                //header in the control list.
    5.        cur_ctrls = FindCtrlHead(markfile);
          }
        //Determine current display state (load
```

TABLE 26-continued

```
        //correct controls, set video position) for
        //current markfile and frame number.
    6.    SetDisplayState(frame);
    7.    mark_video_player.Seek(frame);
    8.    mark_video_player.Play ();
    }
```

TABLE 27

```
HyperVideo::Branch(char *page_tag)
    page_tag   Character string representing page to
               turn to. Null pointer is a valid
               condition and functionality is
               application specific ("game over")
               representation.
Description:   Runtime specific representation of
               application page turn.
Pseudo-Code:
    HyperVideo::Branch(char *page_tag)
    {
        //runtime specific code to turn a page within
        //the application. Handle Null page_tag
        //pointer either here or within BranchToPage
        //application code.
    }
```

TABLE 28

```
Place *HyperVideo::MakePlace()
Description:   Generate a video place representing the
               current markfile and cut point frame
               number.
Returns:       Generated place
Pseudo-Code:
    HyperVideo::MakePlace()
    {
    1.    Place *returnPlace=new Place (VIDEO_PLACE);
    2.    returnPlace->MarkFile(cur_markfile);
    3.    returnPlace->Frame(mark_video_player
                                  >GetFrame());
    4.    return returnPlace;
    }
```

TABLE 29

```
HyperVideo::SetDisplayState(int frame_num)
    frame_num Frame number to display state for
Description:   Called before branching to new video
               location. This function displays all
               controls at the given frame number in
               their correct lifecycle state. This
               function also positions the video at the
               correct location for frame_num.
Pseudo-Code:
    Hypervideo::SetDisplayState(int frame_num)
    {
        //remove all controls from the current display
        //runtime specific code to remove all controls
        //from itemlist. Move the video to the
        //correct position for this frame number
    1.    Mark move_mark;
    2.    move_mark.mark_type = MARK_MOVE_VIDEO;
    3.    move_mark.frame = frame_num;
        //Pass -1 in second parameter to indicate "use
        //frame in mark"
    4.    mark_video_player.getPrevMark(&move_mark, -1);
    5.    OnMoveVideo(&move_mark);
        //Loop through the controls and display them
        //at the correct state (if displayed)
    6.    int display_state;
    7.    int array_size = cur_ctrls->array_size;
    8.    for (int i = 0; i < array_size; i++)
```

TABLE 29-continued

```
        {
9.      Control *ctrl = cur_ctrls->CtrlTable[i];
10.     display_state = ctrl-
        >StateAtFrame(frame_num);
11.     if (display_state == CTRL_UNBORN)
12.         break;
13.     ctrl->Display(display_state);
        }
}
```

TABLE 30

HyperVideo::OnControlBirth(mark *mark_line)
    mark_line  Mark representing a line in a markfile.
                  This contains frame number, mark type,
                  raw data size and raw data bytes.
Description:    Called from mark_video_player to notify
                  of MARK_CTRL_BIRTH. The control is
                  already created and display set. Locate
                  the control in the current control list
                  and add the control the display.
                  Initiate any birth-effects.
Pseudo-Code:
    Hypervideo::OnControlBirth(Mark *mark_line)
    {
        //Loop through cur_ctrls->CtrlTable until find
        //the control with the given mark_line.
    1.  Control *Ctrl =
        FindControlWithMark(mark_line);
        //Add the control the display (birth effect)
    2.  Ctrl->Display(CTRL_BIRTH);
    }

TABLE 31

HyperVideo::OnControlAdult(Mark *mark_line)
    mark_line  Mark representing a line in a markfile.
                  This contains frame number, mark type,
                  raw data size and raw data bytes.
Description:    Called from mark_video_player to notify
                  of MARK_CTRL_ADULT. Locate the control
                  in the current control list and remove
                  any birth-effects.
Pseudo-Code:
    HyperVideo::OnControlAdult(Mark *mark_line)
    {
        //Loop through cur-ctrls->CtrlTable until find
        //the control with the given mark_line.
    1.  Control *Ctrl =
        FindControlWithMark(mark_line);
        //Stop birth effect for the control
    2.  Ctrl->Display(CTRL_ADULT);
    }

TABLE 32

HyperVideo::OnControlRetire(mark *mark_line)
    mark-line  Mark representing a line in a markfile.
                  This contains frame number, mark type,
                  raw data size and raw data bytes.
Description:    Called from mark_video_player to notify
                  of MARK_CTRL_RETIRE. Locate the control
                  in the current control list and add any
                  age-effects.
Pseudo-Code:
    HyperVideo::OnControlRetire(Mark *mark_line)
    {
        //Loop through cur_ctrls->CtrlTable until find
        //the control with the given mark_line.
    1.  Control *Ctrl =
        FindControlWithMark(mark_line);
        //Start age effect for testing, put grey

TABLE 32-continued

//border around the control rectangle.
    2.  Ctrl->Display(CTRL_ADULT);
    }

TABLE 33

HyperVideo::OnControlDeath(Mark *mark_line)
    mark_line  Mark representing a line in a markfile.
                  This contains frame number, mark type,
                  raw data size and raw data bytes.
Description:    Called from mark_video_player to notify
                  of MARK_CTRL_DEATH. Locate the control
                  in the current control list and remove
                  the control from the display.
Pseudo-Code:
    HyperVideo::OnControlDeath(Mark *mark_line)
    {
        //Loop through cur_ctrls->CtrlTable until find
        //the control with the given mark_line.
    1.  Control *Ctrl =
        FindControlWithMark(mark_line);
        //Remove the control from the display
    2.  Ctrl->display(CTRL_DEATH);
    }

TABLE 34

HyperVideo::OnEndOfVideo(Mark *mark_line)
    mark-line  Mark representing a line in a markfile.
                  This contains frame number, mark type,
                  raw data size and raw data bytes.
Description:    Called from mark_video_player to notify
                  of MARK_EOV. GoTo EndOfVideo place.
Pseudo-Code:
    HyperVideo::OnEndOfVideo(Mark *mark_line)
    {
    1.  GoTo(cur_ctrls->eovPlace);
    }

TABLE 35

HyperVideo::OnMoveVideo(mark *mark-line)
    mark-line  Mark representing a line in a markfile.
                  This contains frame number, mark type,
                  raw data size and raw data bytes.
Description:    Called from mark_video_player to notify
                  of MARK_MOVE_VIDEO. Move video to
                  location specified in mark line.
Pseudo-Code:
    HyperVideo::OnMoveVideo(Mark *mark_line)
    {
        //Parse mark_line and determine x,y,width,
        //height. Move the marked video to the given
        //location
    1.  mark_video_player.Move (x,y,width,height);
    }

TABLE 36

HyperVideo::OnButtonUp(runtime specific)
    runtime specific  parameters indicating x,y
                          position of mouse click.
Description:    Determine if control was pressed and
                  prepare to activate control at next cut
                  point
Pseudo-Code:
    HyperVideo::OnButtonUp(int x, int y)
    {
    1.  Control *ctrl = DetermineControl(x,y);
    2.  if (!ctrl)

TABLE 36-continued

```
3.          return;
4.          else
            {
                //Prepare control for activation at next
                //cut point.
5.          SetActiveControl(ctrl);
            }
}
```

TABLE 37

Control *HyperVideo::DetermineControl(int x, int y)
x,y     parameters indicating x,y position of mouse click.
Description:     Determine if displayed control contains x,y position
Returns:     Pointer to topmost control containing x,y point. 0 if no displayed control contains this point.
Pseudo-Code:
```
HyperVideo::DetermineControl(int x, int y)
{
    //Loop through dialog item list (or other
    //runtime specific list containing all
    //displayed objects). For each object
    //displayed, if object->isA(Control)
    //and object->Contains(x,y) return object;
    //If no object found return 0;
}
```

TABLE 38

HyperVideo::SetActiveControl(Control *ctrl)
    ctrl Control selected from display. This control should be activated at the next cut point
Description:     Highlight control and setup cut point notification.
Pseudo-Code:
```
HyperVideo::SetActiveControl(Control *ctrl)
{
1.   active_control = ctrl;
2.   ctrl->Highlight();
3.   mark_video_player.SetNotification(CTRL_CUT_POINT, Activate Control);
}
```

TABLE 39

HyperVideo::ActivateControl(Mark *)
Description:     Called from mark_video_player upon notification of CTRL_CUT_POINT;
Pseudo-Code:
```
Hypervideo::ActivateControl(Mark *)
{
1.   if(!active_control)
     {
         //Don't do anything if there is no active
         //control
2.       return;
     }
3.   else
     {
4.       GoTo(active_control->Place);
5.       active_control = 0;
6.       mark-video_player->SetNotification(CTRL-CUT-POINT, 0);
     }
}
```

TABLE 40

Control *HyperVideo::FindControlWithMark(Mark *mark)
mark     Pointer to mark representing control.
Description:     Locate control represented by mark in current control list.
Returns:     Control containing mark or 0 of no control matched.
Pseudo-Code:
```
Hypervideo::FindControlWithMark(Mark *mark)
{
1.   Control **ctrl_array = cur_ctrls->CtrlTable;
2.   int array_size = cur_ctrls->array_size;
3.   for (int=0; i<array_size; I++)
     {
4.       Control *cur_ctrl = ctrl_array[i];
5.       if (cur_ctrl->mark == mark)
6.           return cur_ctrl;
     }
7.   return 0;
}
```

Hypervideo Place Class Description

A listing and brief description of the Hypervideo Place Class 620 is provided below in Table 41:

TABLE 41

Place Class
Public Interface:

| | |
|---|---|
| Place() | Standard constructor, initialize data |
| Place(Mark *mark_line) | Constructor which accepts a mark_line |
| Place(int mark_type) | Constructor which accepts a mark_type |
| Boolean isA(int place_type) | Returns True if place is of type place_type |
| ContentTag MarkFile() | Returns integer representing frame number (for video place) |
| int Frame() | Returns integer representing frame number (for video place) |
| char *Page() | Returns page tag (for page place) |
| Markfile(ContentTag markfile) | Sets the markfile (for a video place) |
| Frame(int frame_num) | Sets the frame number (for a video place) |
| Page(char *page_tag) | Sets the page tag (for a page place) |

Instance Data:

| | |
|---|---|
| int place_type | Type of place object |
| char *page_tag | Page Name (if page place) |
| ContentTag *markfile | Markfile (if video place) |
| int frame_number | Frame number (if video place) |

HyperVideo Control Class Description

A listing and brief description of the Hypervideo Control Class (HVControl) 714 is provided below in Table 42:

TABLE 42

Control Class
Public Interface:

Control()
    Control(Mark *mark_line)
    LoadImage()
    Display(int control_state)
    Highlight()
    StateAtFrame(int frame_num)

Instance Data:

int x,y,width,height
    boolean transparent
    boolean clickable

TABLE 42-continued

```
        char *bitmap_file
        char *control_text
        char *effect
        Place destination
        Frame birth_frame
        Frame adult_frame
        Frame retire_frame
        Frame death_frame
        Frame *ctrl_mark
```

MarkVideo Class Description

A brief description of the Hypervideo MarkVideo Class 614 is provided below in Table 43:

TABLE 43

```
MarkVideoClass
Public Interface:

MarkVideo()
        Open(ContentTag markfile, boolean load_video)
        OpenVideo()
        Play()
        PlayToMark(short mark_id)
        Seek(Frame frame)
        Pause()
        Stop()
        Close()
        Move(int x, int y, int width, int height)
        Clear Notification()
        SetNotification(int mark_type, func*)
        OnFrameNotify(Frame frame_num)
        int getNextMark(Mark *mark, int mark_index)
        int MarkCount(int mark_type)
Instance Data:

ContentTag cur_markfile
        func *callback_array[max_mark]
        MediaVideo *video
        Frame cur_frame
        HyperVideo *hyper_video
        MarkVideo model
        int mark_index
```

HyperVideo Mark Class Description

A brief description of the HyperVideo Mark Class 624 is provided below in Table 44 as follows:

TABLE 44

```
Mark Class
Public Interface:

Mark()
        Frame Frame()
        int MarkType()
        int DataSize()
        byte *Data()
        Operator --
Instance Data:

Frame frame_no
        int mark_type
        int byte_size
        byte *bytes
```

HyperVideoModel Class Description

A brief description of the HyperVideoModel Class is provided below in Table 45:

TABLE 45

```
HyperVideoModel Class
Public Interface:

HyperVideoModel(ContentTag markfile, ContentTag
                             videofile)
        LoadExisting(ContentTag markfile, ContentTag
                             videofile)
        CreateNew(contentTag markfile, ContentTag
                             videofile)
        int getNextMark(Mark *mark, int mark_index)
        int MarkCount(int mark_type)
        AddMark(Mark *mark)
        DeleteMark(Mark *mark)
        Commit()
        LoadHeader();
        LoadBody();
Instance Data:

ContentTag videofile;
        int max_mark;
        Mark *mark_list[ ];
```

CtrlHeader Struct Object Description

A brief description of the Hypervideo CtrlHeader Struct object is provided in Table 46 below:

TABLE 46

```
CtrlHeader Struct
Instance Data:

ContentTag fileTag
        CtrlHeader *next
        Place *eovPlace
        int array_size
        Ctrl *CtrlTable[]
```

MarkVideo Function Definition

A brief description of the MarkVideo object 614 function in pseudo-code is provide below in Table 47:

TABLE 47

```
MarkVideo::OnFrameNotify(Frame x)
Pseudo-Code:
        MarkVideo::OnFrameNotify(Frame x)
        {
            //Call mvm.getNextMark while there are more
            //marks at the given frame. For each mark,
            //call appropriate hyper_video function
        }
```

HyperVideoModel Function Definition

A brief description of the Hypervideo constructor object for constructing and loading existing and new mark files into system memory is provided below in Tables 48–50:

TABLE 48

```
HyperVideoModel::HyperVideoModel(ContentTag markfile,
                             Content Tag videofile)
Description:     Constructor. Load contents of markfile
                 into memory. Create new default file if
                 markfile doesn't exist.
Pseudo-Code:
        HyperVideoModel::HyperVideoModel(content Tag
        markfile, ContentTag videofile)
        {
            //Resolve markfile content tag to determine if
            //it exists and to read in contents if
            //markfile exists, load existing
        1.  if(markfile exists)
```

TABLE 48-continued

```
2.      LoadExisting(markfile, videofile)
3.    else
4.      CreateNew(markfile, videofile)
}
```

TABLE 49

```
HyperVideoModel::LoadExisting(contentTag markfile,
                              ContentTag videofile
Description:    Load contents of existing markfile into
                internal data structure.
Pseudo-Code:
        HyperVideoModel::LoadExisting(contentTag markfile,
        ContentTag videofile)
        {
        1.      LoadHeader();
                //if videofile &&
                //(videofile!=header.videofile) warn user of
                //error and use videofile from markfile
        2.      LoadBody();
        }
```

TABLE 50

```
HyperVideoModel::CreateNew(ContentTag markfile,
                            ContentTag videofile)
Description:    Create a new markfile to mark the
                videofile. Tool specific functionality
Pseudo-Code:
        HyperVideoModel::CreateNew(ContentTag markfile,
        ContentTag videofile)
        {
                //if !videofile || videofile doesn't exist
                //   Exit with error
        1.      ::videofile = videofile;
        2.      max_mark = HYPER_VIDEO_MAX-MARK;
                //Create two marks:
                //   1 for frame 0 with default
                //       MARK_MOVE_VIDEO position
                //   1 for frame n with default MARK_EOV place
                //       store these in the body array
        }
```

In accordance with one embodiment, the interactive hypervideo editing system and interface is embodied in a computer-readable article of manufacture that, when read and interpreted by a computer, effectuates the hypervideo functionality as described herein. The computer readable article of manufacture may be a compact disk, an optical disk, a magnetic disk, or other computer readable medium that contains hypervideo editing system and interface program software.

It will, of course, be understood that various modifications and additions can be made to the embodiments discussed hereinabove without departing from the scope or spirit of the present invention. Accordingly, the scope of the present invention should not be limited to the particular embodiments discussed above, but should be defined only by the claims set forth below and equivalents of the disclosed embodiments.

What is claimed is:

1. A computer-implemented hypervideo interface including a computer coupled to a display for displaying a primary video segment comprising a plurality of video frames and a secondary media file, and an input device coupled to the computer, the hypervideo interface comprising:

means for displaying on the display the primary video segment and a user-actuatable hypervideo control having visually perceivable characteristics; and means, operatively coupled to the displaying means, for modifying the perceivable characteristics of the hypervideo control at predetermined frames of the primary video segment from a first set of perceivable characteristics to a second set of perceivable characteristics using transition effects to visually convey to a user impending removal of the hypervideo control from the display;

wherein actuation of the hypervideo control by the user initiates a hypervideo action to effect a branch transition between the primary video segment and the secondary media file.

2. The system of claim 1, wherein the modifying means includes means for modifying the perceivable characteristics of the hypervideo control upon initiating one of a plurality of distinct lifecycle phases of the hypervideo control.

3. The system of claim 1, wherein the modifying means includes means for modifying the perceivable characteristics of the hypervideo control upon initiating any of a childhood, adulthood, and retirement lifecycle phase of the hypervideo control.

4. The system of claim 1, wherein the modifying means includes means for modifying the visually perceivable characteristics of the hypervideo control during a first phase during which the hypervideo control is introduced on the display and a second phase during which the hypervideo control is removed from the display.

5. The system of claim 1, wherein the modifying means includes means for modifying the visually perceivable characteristics of the hypervideo control during a childhood phase during which the hypervideo control is introduced on the display, an adulthood phase during which the hypervideo control is displayed in a steady state form on the display, and a retirement phase during which the hypervideo control is removed from the display.

6. The system of claim 5, wherein:

the childhood phase is initiated by a birth event and terminated with an adult event;

the adulthood phase is initiated by the adult event and terminated with a retire event; and the retirement phase is initiated by the retire event and terminated with a death event.

7. The system of claim 6, wherein each of the birth and retire events initiates a visually perceivable transitioning effect, and each of the adult and death events terminates the visually perceivable transitioning effect, respectively.

8. The system of claim 1, wherein the branch transition action between the primary video segment and secondary media file is delayed until a cutpoint frame of the primary video segment is encountered, the cutpoint frame representing a thematic transition point associated with the subject matter of the primary video segment.

9. The system of claim 1, wherein the modifying means includes means for associating mark data stored in a mark data computer file to the perceivable characteristics of the hypervideo control at the predetermined frames of the primary video segment.

10. The system of claim 9, wherein the mark data is stored in the mark data computer file in an ASCII format.

11. The system of claim 1, wherein the secondary media file comprises any one of a secondary video file, a secondary graphics file, a secondary text file, and a secondary animation file.

12. A computer-implemented hypervideo interface including a computer coupled to a display and to an input device, the hypervideo interface comprising:

a display for displaying a primary video segment comprising a plurality of video frames, a plurality of secondary media files, and a user-actuatable hypervideo control defining an association between the primary video segment and a user-selected one of the plurality of secondary media files; and a processor for modifying the appearance of the hypervideo control at a plurality of lifecycle events of the hypervideo control from a first set of perceivable characteristics to a second set of perceivable characteristics using transition effects to convey to a user the occurrence of the lifecycle event, wherein each of the plurality of lifecycle events and corresponding appearance modifications occurring at a predetermined frame of the primary video segment;

wherein user-actuation of the hypervideo control initiates a hypervideo action to effect a branch transition between the primary video segment and the user-selected one of the plurality of secondary media files.

13. The system of claim 12, wherein the processor modifies the visually perceivable characteristics of the hypervideo control at a birth event during which the hypervideo control is initially displayed on the display and a death event during which the hypervideo control is removed from the display.

14. The system of claim 12, wherein the processor modifies the visually perceivable characteristics of the hypervideo control at a birth event during which the hypervideo control is initially displayed on the display, an adult event during which the hypervideo control is displayed on the display in a steady state form, and a death event during which the hypervideo control is removed from the display.

15. The system of claim 14, wherein the processor modifies the visually perceivable characteristics of the hypervideo control during a retirement lifecycle phase defined between a retire event and the death event, the retire event occurring subsequent to the adult event.

16. The system of claim 12, wherein the processor modifies the visually perceivable characteristics of the hypervideo control during a childhood lifecycle phase defined between the birth event and the adult event.

17. The system of claim 12, wherein the branch transition action between the primary video segment and the user-selected one of the plurality of secondary media files is delayed until a cutpoint frame of the primary video segment is encountered, the cutpoint frame representing a thematic transition point associated with the subject matter of the primary video segment.

18. The system of claim 12, wherein the processor modifies mark data stored in a mark data computer file to the perceivable characteristics of the hypervideo control at the predetermined frames of the primary video segment.

19. The system of claim 18, wherein the mark data is stored in the mark data computer file in an ASCII format.

20. The system of claim 12, wherein the plurality of secondary media files comprise any one of a secondary video file, a secondary graphics file, a secondary text file, and a secondary animation file.

21. A method for implementing a computer-implemented hypervideo interface displayable on a display, comprising the steps of:

playing on the display a primary video segment comprising a plurality of video frames;

displaying on the display a user-actuatable hypervideo control having visually perceivable characteristics;

modifying the perceivable characteristics of the hypervideo control from a first set of perceivable characteristics to a second set of perceivable characteristics using transition effects at predetermined video frames of the primary video segment to convey to a user the occurrence of a lifecycle event; and branching between the primary video segment and a secondary media file upon actuation of the hypervideo control.

22. The method of claim 21, wherein the modifying step includes the steps:

modifying the perceivable characteristics of the hypervideo control to a childhood state at a first predefined video frame when the hypervideo control is initially displayed;

modifying the perceivable characteristics of the hypervideo control to an adulthood state at a second predefined video frame subsequent to the first predefined video frame; and modifying the perceivable characteristics of the hypervideo control to a retirement state at a third predefined video frame subsequent to the second predefined video frame.

23. The method of claim 22, wherein:

the childhood state is initiated by a birth event and terminated with an adult event;

the adulthood state is initiated by the adult event and terminated with a retire event; and the retirement state is initiated by the retire event and terminated with a death event.

24. The method of claim 23, wherein:

the perceivable characteristics of the hypervideo control transition from a first transition state at the birth event to a second transition state at the adult event; and the perceivable characteristics of the hypervideo control transition from a third transition state at the retire event to a fourth transition state at the death event.

25. The method of claim 21, wherein the modifying step includes the step of reading a mark data file containing hypervideo control parameters that define the perceivable characteristics of the hypervideo control.

26. The method of claim 21, wherein the modifying step includes the step of reading a mark data file containing hypervideo control parameters that define a distinct set of perceivable characteristics of the hypervideo control for each of a childhood phase, during which the hypervideo control is initially displayed, an adulthood phase, during which the hypervideo control is displayed in a steady state form, and a retirement phase, during which the hypervideo control is removed from the display.

27. The method of claim 21, wherein the step of branching between the primary video segment and the secondary media file is delayed until a cutpoint frame of the primary video segment is encountered, the cutpoint frame representing a thematic transition point associated with the subject matter of the primary video segment.

28. A system for navigating a hypervideo interface within a computer-implemented environment, comprising:

a display for displaying a primary video segment and a user-actuatable hypervideo control associated with a portion of the primary video segment, the hypervideo control having visually perceivable characteristics; and a processor that modifies the perceivable characteristics of the hypervideo control from a first set of perceivable characteristics to a second set of perceivable characteristics using transition effects during displaying of the primary video segment portion to convey to a user the occurrence of a lifecycle event;

wherein actuation of the hypervideo control by a user during displaying of the primary video segment portion initiates a hypervideo action associated with the hypervideo control.

29. The system of claim 28, wherein the processor modifies the perceivable characteristics of the hypervideo control at a plurality of distinct lifecycle events defined for the primary video segment portion.

30. The system of claim 28, wherein a cutpoint is defined within the primary video segment portion, and actuation of the hypervideo control by a user during displaying of the primary video segment portion prior to the cutpoint is delayed until the cutpoint is encountered.

31. The system of claim 28, wherein:

the hypervideo control and hypervideo action are defined in a computer readable mark video file; and the primary video segment comprises an audio signal portion and a video signal portion, the audio and video signal portions being defined in a computer readable audio/video file separate from the mark video file.

32. A computer program product, comprising:

an article of manufacture comprising a computer usable medium having computer readable program code embodied therein for causing a computer to navigate a hypervideo interface within a computer-implemented multimedia application environment, the computer readable program code embodied in the article of manufacture comprising:

means for causing the computer to display in the hypervideo interface a primary video segment and a user-actuatable hypervideo control having visually perceivable characteristics associated with a portion of the primary video segment; and means, operatively coupled to the causing means, for modifying the perceivable characteristics of the hypervideo control from a first set of perceivable characteristics to a second set of perceivable characteristics using transition effects during displaying of the primary video segment portion to convey to a user the occurrence of a lifecycle event;

wherein actuation of the hypervideo control by a user during displaying of the primary video segment portion initiates a hypervideo action associated with the hypervideo control.

33. The system of claim 32, wherein:

the hypervideo control and hypervideo action are defined in a computer readable mark video file contained in the computer usable medium; and the primary video segment comprises an audio signal portion and a video signal portion, the audio and video signal portions contained in a computer readable audio/video file in the computer usable medium separate from the mark video file.

34. A computer-implemented hypervideo interface, comprising:

a display for displaying a primary video segment defined in a computer readable media file and for displaying a user-actuatable hypervideo control associated with a portion of the primary video segment, the hypervideo control having visually perceivable characteristics and being defined in a computer readable ASCII file; and a processor that reads the ASCII file to effect modifications in the perceivable characteristics of the hypervideo control from a first set of perceivable characteristics to a second set of perceivable characteristics using transition effects during displaying of the primary video segment portion to convey to a user the occurrence of a lifecycle event.

* * * * *

UNITED STATES PATENT AND TRADEMARK OFFICE
CERTIFICATE OF CORRECTION

PATENT NO. : 5,966,121
DATED : OCTOBER 12, 1999
INVENTOR(S): HUBBELL ET AL.

It is certified that error appears in the above-identified patent and that said Letters Patent is hereby corrected as shown below:

Col. 2, line 54: "exist" should read --exists--

Col. 4, line 66: "an" should read --a--

Col. 12, line 38: delete "15" before the word "into"

Col. 13, line 58: move "}" over to column "MARK DATA" under the word "dest_frm"

Col. 13, line 63: move "}" over to column "MARK DATA" under the word "dest_frm"

Col. 31, line 48: "HVControRuntime Object" should read --HVControlRuntime Object--

Col. 33, line 47: "VoidMFVoid (voidfunco)" should read --VoidMFVoid (voidfunc())--

Signed and Sealed this

Tenth Day of April, 2001

*Attest:*

NICHOLAS P. GODICI

*Attesting Officer*     *Acting Director of the United States Patent and Trademark Office*